(12) United States Patent
Febbo et al.

(10) Patent No.: US 11,593,628 B2
(45) Date of Patent: Feb. 28, 2023

(54) DYNAMIC VARIABLE BIT WIDTH NEURAL PROCESSOR

(71) Applicant: Apple Inc., Cupertino, CA (US)

(72) Inventors: Paolo Di Febbo, Cupertino, CA (US); Waleed Abdulla, Cupertino, CA (US); Chaminda N. Vidanagamachchi, Cupertino, CA (US); Yohan Rajan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 346 days.

(21) Appl. No.: 16/810,675

(22) Filed: Mar. 5, 2020

(65) Prior Publication Data
US 2021/0279557 A1    Sep. 9, 2021

(51) Int. Cl.
*G06N 3/063*    (2006.01)
*G06N 3/08*    (2023.01)
*G06N 3/04*    (2023.01)

(52) U.S. Cl.
CPC .............. *G06N 3/063* (2013.01); *G06N 3/04* (2013.01); *G06N 3/08* (2013.01)

(58) Field of Classification Search
CPC ............ G06N 3/063; G06N 3/04; G06N 3/08; G06N 3/0481; G06N 3/0454; G06N 3/084; G06N 3/082; G06N 3/088; G06N 3/02; G06N 3/0445; G06F 9/3897; G06F 15/7867; G06F 11/1423; G06F 11/1428; G06F 12/0646; G06F 15/8076; G06F 3/0629; G06F 9/30036; G06F 7/523; G06F 7/5443; G06F 9/3001; G06F 2207/3852; G06F 2207/4824; G06F 40/263; G06F 40/42; G06F 40/58; G06F 7/4806; G06F 9/3826; G06F 9/3885; G06F 9/445; H03M 7/3026; H03M 3/502; H03M 7/3033; H03M 3/50; H03M 1/1038; H03M 3/30;
(Continued)

(56) References Cited

U.S. PATENT DOCUMENTS 9,582,472 B2   2/2017 Angerer et al.
10,228,911 B2  3/2019 Henry et al.
(Continued)

OTHER PUBLICATIONS

Sharma, H. et al., "Bit Fusion: Bit-Level Dynamically Composable Architecture for Accelerating Deep Neural Networks," Proceedings of the 45th International Symposium on Computer Architecture, May 30, 2018, pp. 1-12.

*Primary Examiner* — Nimesh Patel
(74) *Attorney, Agent, or Firm* — Fenwick & West LLP

(57) ABSTRACT

Embodiments relate to an electronic device that includes a neural processor having multiple neural engine circuits that operate in multiple modes of different bit width. A neural engine circuit may include a first multiply circuit and a second multiply circuit. The first and second multiply circuits may be combined to work as a part of a combined computation circuit. In a first mode, the first multiply circuit generates first output data of a first bit width by multiplying first input data with a first kernel coefficient. The second multiply circuit generates second output data of the first bit width by multiplying second input data with a second kernel coefficient. In a second mode, the combined computation circuit generates third output data of a second bit width by multiplying third input data with a third kernel coefficient.

36 Claims, 15 Drawing Sheets

(58) Field of Classification Search
CPC .......... H03M 3/436; H03M 3/51; H03M 9/00;
H03M 3/402; H03M 3/36; H04B 1/712;
H04B 2201/7071; H04B 7/0695; H04B
2001/0408; H04B 7/0617; H04B 7/0626;
G06T 3/4046; G06T 3/4053; G06T
3/4007; G06T 1/20; G06T 1/60; G06T
2200/28; G06T 2207/20084; G06T 5/50;
G06T 7/20; G06T 5/20; G06T
2207/10016; H04M 2201/34
See application file for complete search history.

(56) References Cited

U.S. PATENT DOCUMENTS

| | | | |
|---|---|---|---|
| 2016/0026912 | A1 | 1/2016 | Falcon et al. |
| 2017/0200094 | A1 | 7/2017 | Bruestle et al. |
| 2018/0046905 | A1* | 2/2018 | Li .................... G06N 3/063 |
| 2018/0165575 | A1* | 6/2018 | Henry ............... G06N 3/063 |
| 2019/0266485 | A1* | 8/2019 | Singh ............... G06N 3/0454 |
| 2019/0325301 | A1 | 10/2019 | Wang et al. |
| 2020/0097792 | A1* | 3/2020 | Chen ............... G06F 9/30014 |
| 2020/0202199 | A1* | 6/2020 | Lee ................. G06N 3/0454 |
| 2021/0097887 | A1* | 4/2021 | Lin .................. G10L 15/22 |
| 2022/0101133 | A1* | 3/2022 | Ardywibowo ....... G06N 3/0481 |

\* cited by examiner

DYNAMIC VARIABLE BIT WIDTH NEURAL PROCESSOR

BACKGROUND

1. Field of the Disclosure

The present disclosure relates to a circuit for performing operations related to neural networks, and more specifically multiply circuits in a plurality of neural engine circuits that operates in different modes.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning techniques that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying various post-processing operations. Using a central processing unit (CPU) and its main memory to instantiate and execute machine learning systems or models of various configurations is relatively easy because such systems or models can be instantiated with mere updates to code. However, relying solely on the CPU for various operations of these machine learning systems or models would consume significant bandwidth of a central processing unit (CPU) as well as increase the overall power consumption.

Conducting computations related to ANNs can involve a large number of complex operations that could draw significant portions of power and other resources from an electronic device. The speed of completing computations and reaching inference results may also be perceived by users as related to the overall quality of the electronic device. As such, the performance of an electronic device could be adversely affected by the handling of the computations related to ANNs.

SUMMARY

Embodiments relate to a neural engine circuit in neural processor that includes a a first multiply circuit and a second multiply circuit that are operable in different modes. The neural engine circuit receives, in a first mode, first input data and second input data from a buffer circuit. The neural engine circuit generates, in the first mode, using the first multiply circuit, first output data of a first bit width by multiplying the first input data to a first kernel coefficient. The neural engine circuit also generates, in the first mode, using the second multiply circuit, second output data of the first bit width by multiplying the second input data to a second kernel coefficient. The neural engine circuit receives, in the second mode, third input data from the buffer circuit. The neural engine circuit also operates, in the second mode, the first multiply circuit with at least the second multiply circuit as a combined computation circuit to generate third output data of the second bit width by multiplying the third input data to a third kernel coefficient.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural processor that includes one or more neural engines that can be operated in different modes for computations in different bit widths to allow the neural processor to dynamically adjust the power consumption and bandwidth allocation to computations related to training and using machine learning models to make inferences. A multi-mode neural engine may include more than one multiply circuit. In a first mode, the multiply circuits may operate independently and generate distinct output data of a first bit width in parallel. In a second mode, the multiply circuits may operate together to form a combined computation circuit that generates an output data of a second bit width. The second bit width is greater than the first bit width.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

Figure 1:
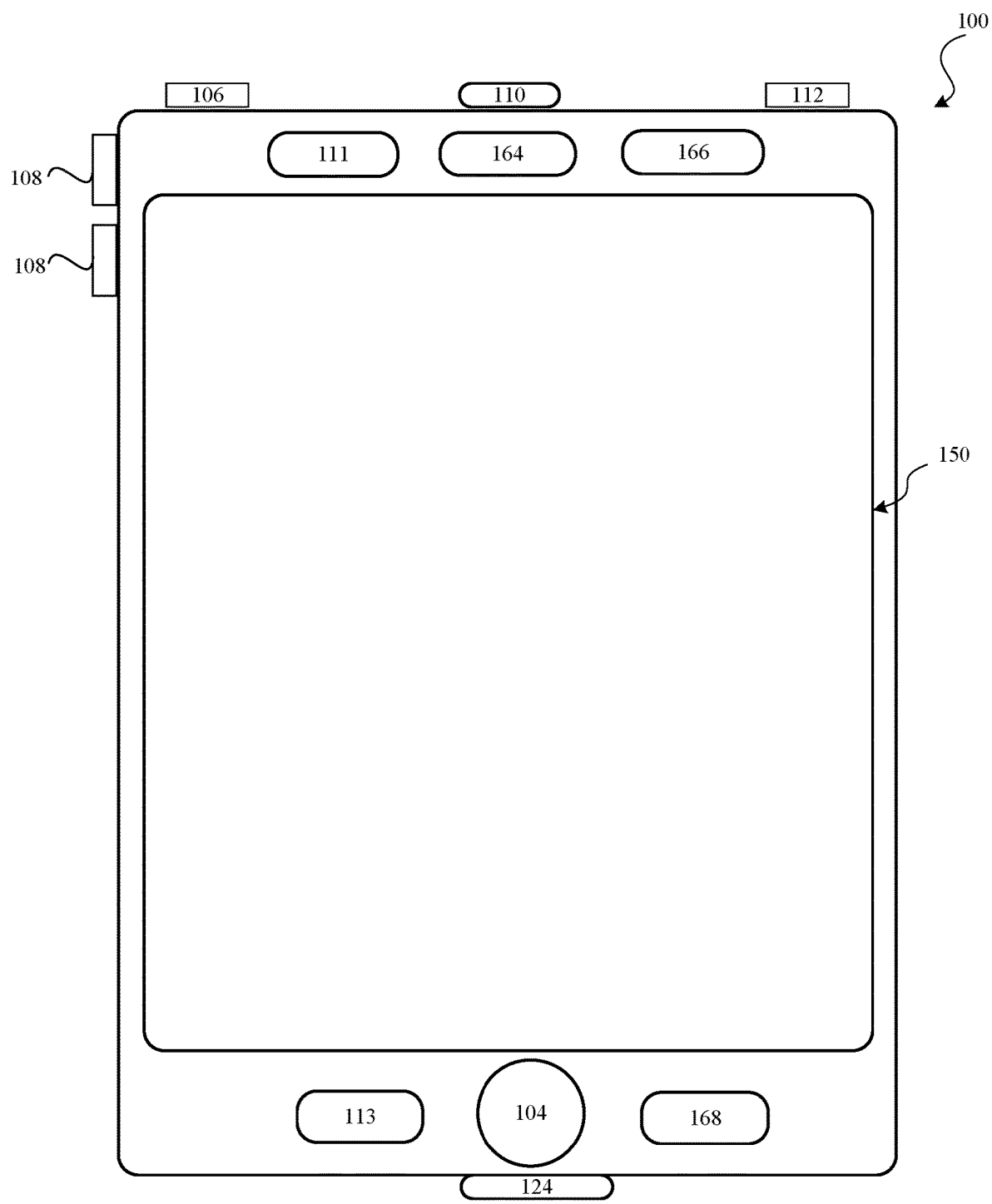
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
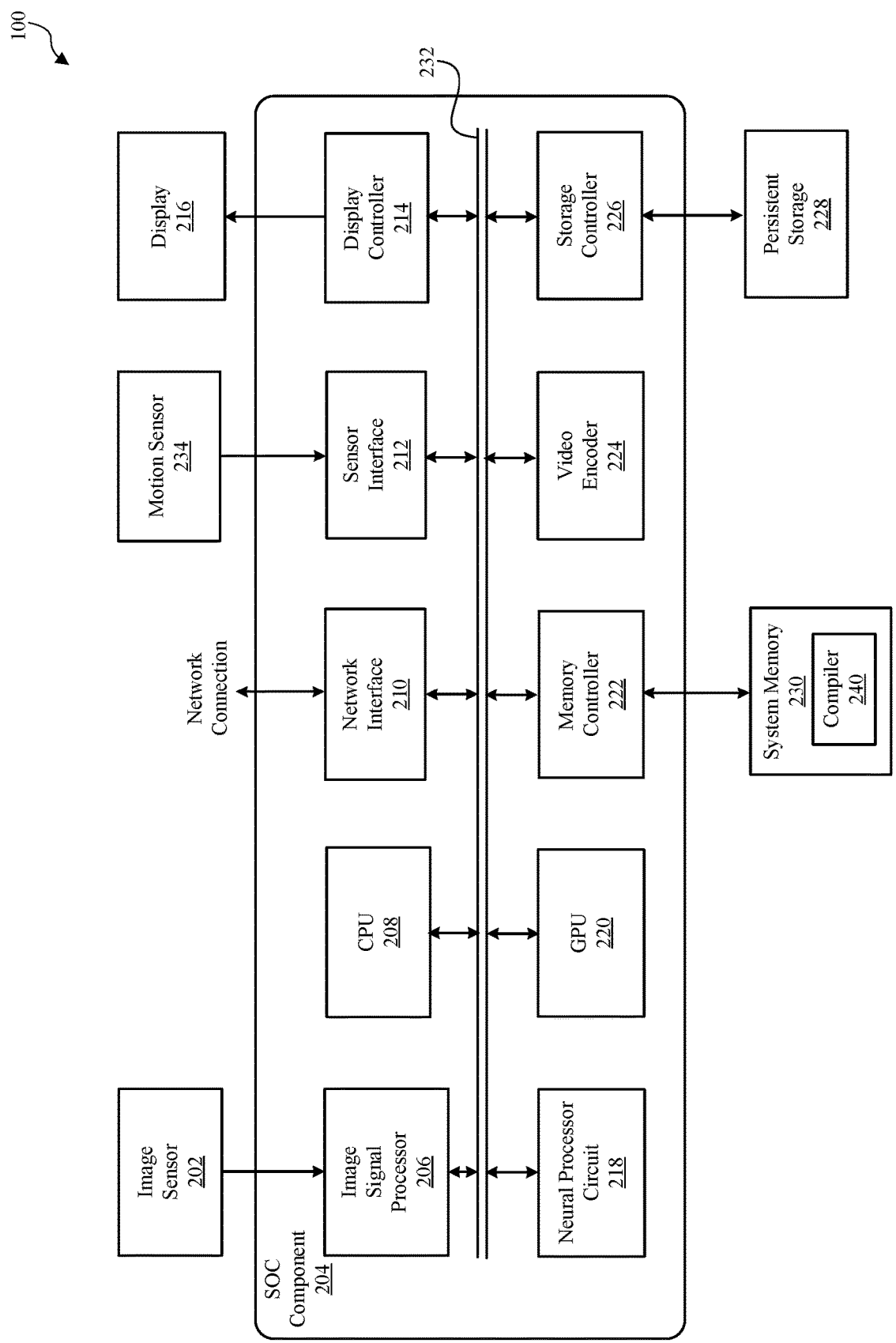
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In one embodiment, system memory 230 includes a compiler 240. Compiler 240 is architected to reduce data fetch and read operations between a neural processor circuit 218 and system memory 230, as will be further described below.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
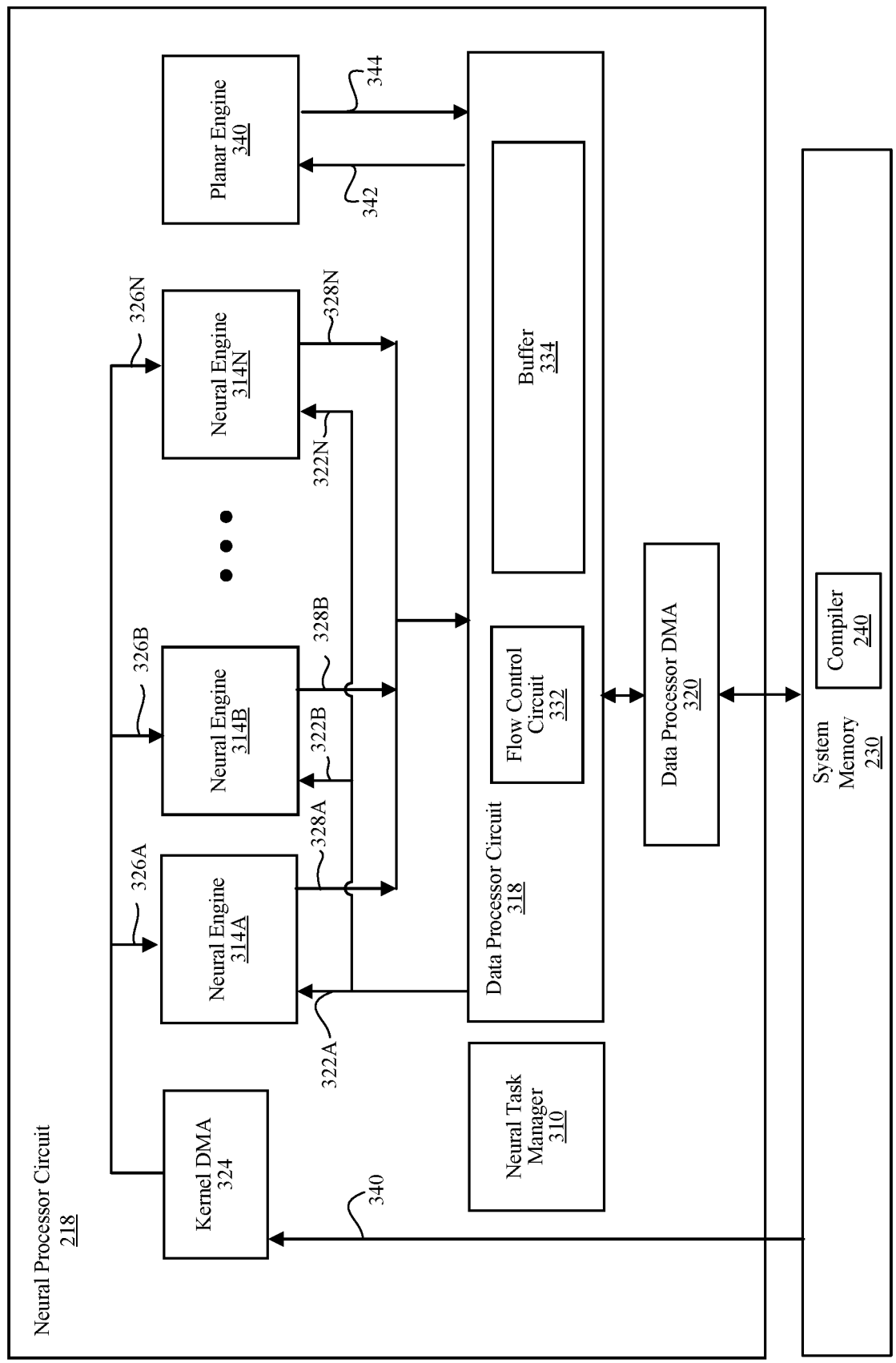
FIG. 3 is a block diagram illustrating an example neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

Neural task manager 310 manages the overall operation of neural processor circuit 218. Neural task manager 310 may receive a task list from compiler 240 executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer 334. Buffer 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Example Neural Engine Architecture

Figure 4:
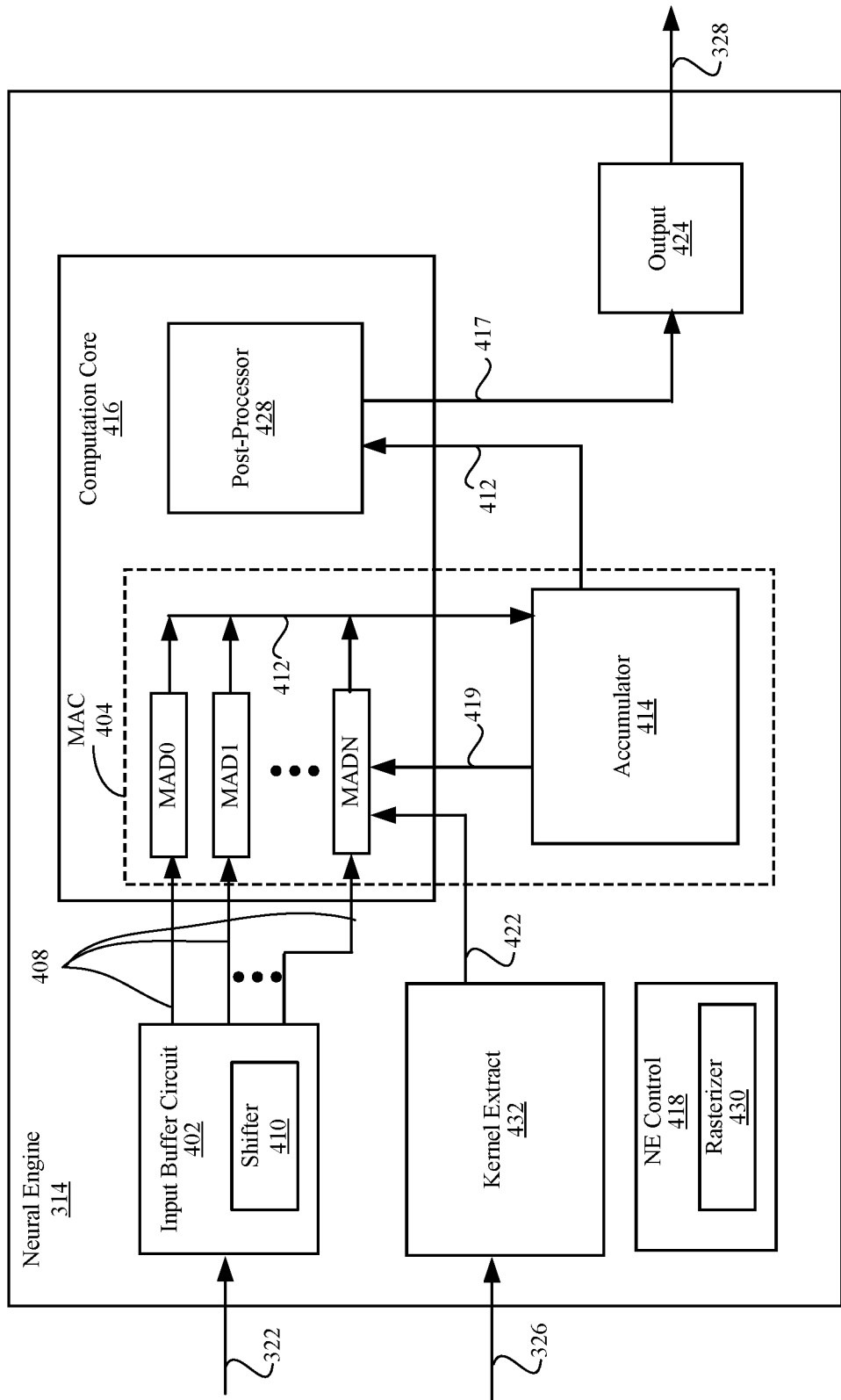
FIG. 4 is a block diagram of an example neural engine in the neural processor circuit, according to one embodiment.

FIG. 4 is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator 414 and output circuit 424. Neural engine 314 may include fewer components than what is illustrated in FIG. 4 or include further components not illustrated in FIG. 4.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator 414 is a memory circuit that receives and stores processed values 412 from MAD circuits. The processed values stored in accumulator 414 may be sent back as feedback information 419 for further multiply and add operations at MAD circuits or sent to post-processor 428 for post-processing. Accumulator 414 in combination with MAD circuits form a multiply-accumulator (MAC) 404. In one or more embodiments, accumulator 414 may have subunits where each subunit sends data to different components of neural engine 314. For example, during a processing cycle, data stored in a first subunit of accumulator 414 is sent to the MAC circuit while data stored in a second subunit of accumulator 414 is sent to post-processor 428.

Post-processor 428 is a circuit that performs further processing of values 412 received from accumulator 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at the post-processor 428 is bypassed. For example, the data in accumulator 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314.

In some cases, input data may split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, buffer DMA 320, data buffer 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Input data may be split into smaller pieces of data for parallel processing at multiple neural engines 314. Often multiple cycles of operations are performed to generate output for a task associated with a neural network. The compiler 240 executed by CPU 208 analyzes the hierarchy and layers of the neural network and determines how the input data is to be segmented based on the hardware constraints of the neural processor circuit 218. One of the functions of the compiler 240 is to determine how input data is to be split into smaller data units for processing at the neural engines 314, and how the processing is to be iterated in loops to produce the result for tasks.

Example of Multi-Mode Multiply Circuits

A neural engine may perform various computations that are related to training and operating of machine learning models. The computations may include multiplying an input data to a kernel coefficient, determining the value of an activation function, determining a weighted sum of a polynomial, and another suitable computation such as determining gradient in coordinate descent. Various computations related to machine learning operations may include multiplications of floating point numbers or integers that may involve the use or one or more multiply circuits. A neural engine 314 may include one or more multiply circuits 500 that can be operated in different modes for bit precisions of machine learning operations.

Figure 5A:
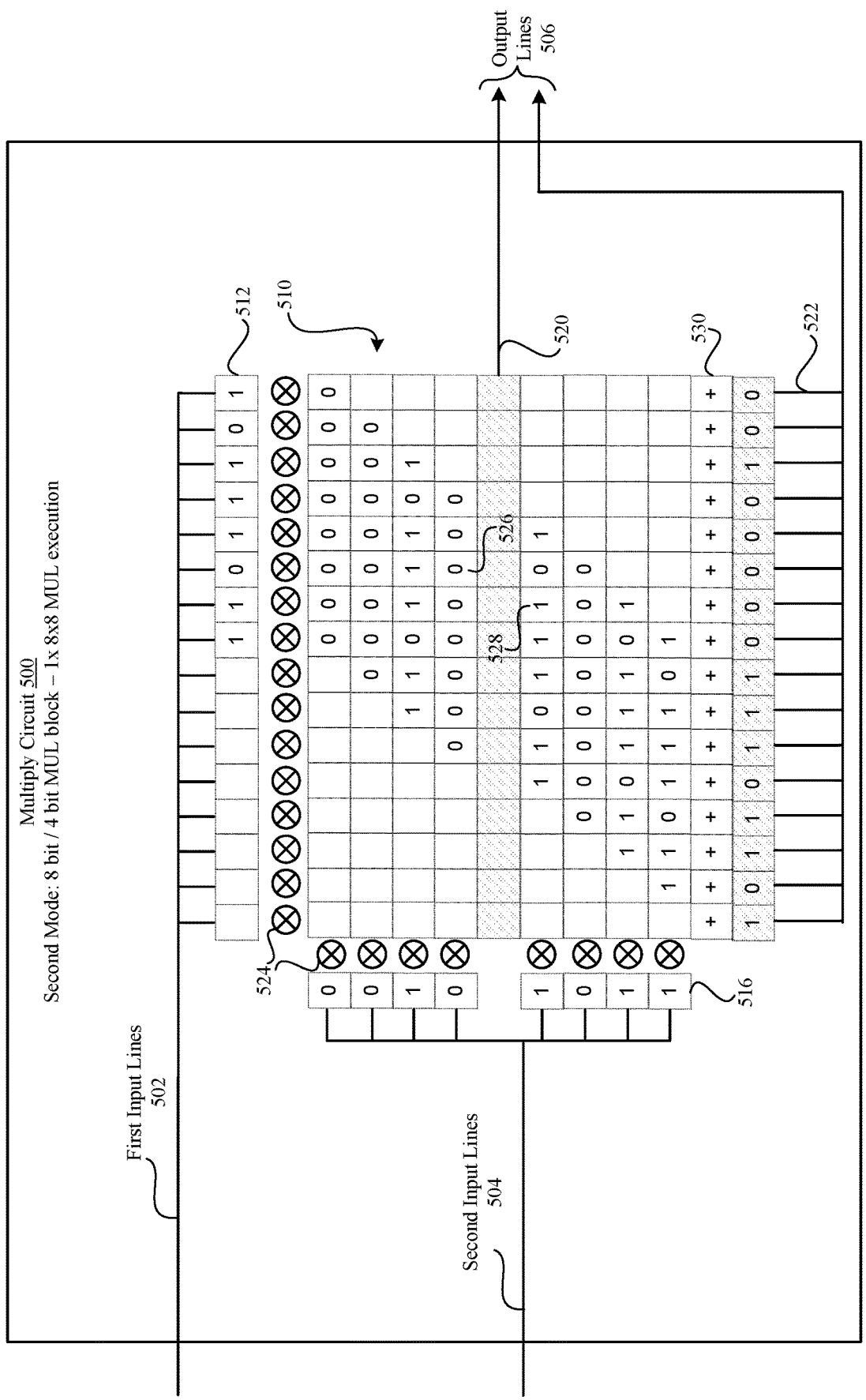
FIG. 5A is a conceptual diagram illustrating an example multi-mode neural engine circuit, according to one embodiment.

FIG. 5A is a conceptual diagram illustrating an example embodiment of a multi-mode multiply circuit 500. The multiply circuit 500 may correspond to a part of a MAD circuit in MAC 404 shown in FIG. 4. For example, multiply circuit 500 may be responsible for the multiplication and multiply circuit 500 may be connected to one or more adder circuits and accumulator circuits for the MAC 404. In various embodiments, not every single MAD circuit in MAC 404 may contain the multiply circuit 500 for operating in multiple modes. The multiply circuit 500 may include first input lines 502, second input lines 504, output lines 506, and a combined computation circuit 510. In various embodiments, multiply circuit 500 may include fewer or additional circuit components that are not shown in FIG. 5A. Also, a multiply circuit 500 may include multiple copies of the circuit components shown in FIG. 5A. For example, each multiply circuit 500 may include multiple combined computation circuits 510. Furthermore, while in FIG. 5A some components are shown as directly coupled to each other, such as first input lines 502 and combined computation circuit 510 being connected to each other, the components may be indirectly coupled to additional circuit component(s) that are not shown between the two components.

First input lines 502 are coupled to an input source (e.g., an input buffer circuit 402) that stores input data of the multiply circuit 500. Other buffer circuits, such as buffer 334, may also function as the input source of multiply circuit 500. First input lines 502 may be coupled (directly or indirectly) to the input source to receive the input data. The input data may correspond to data associated with one or more machine learning models. In some embodiments, first input lines 502 does not contain any buffer components and may serve as direct line-in to pass input data to subsequent components without temporary storage. As discussed in further detail with reference to FIG. 5B, depending on the operation mode of multiply circuit 500, first input lines 502 may receive multiple sets of input data at a time. For each mode, the input data may have a different bit width (e.g., 2 bit, 4 bit, 8 bit, or 16 bit). Input data are transmitted to one or more registers 512 through multiple lines, each of which may transmit a bit of input data. Registers 512 may be used to duplicate bits that are used in combined computation circuit 510.

Second input lines 504 may be coupled to the same input source of first input lines 502 or another input source of multiply circuit 500. For example, second input lines 504 may be coupled to kernel extract circuit 432 shown in FIG. 4. The input data values received in second input lines 504 may correspond to a second type of machine learning data such as kernel coefficients that may be used in a CNN. For other types of machine learning models, second input lines 504 may be used to receive other input data for multiply circuit 500. Similar to first input lines 502, second input lines 504 may or may not contain any buffer components and may serve as direct line-in to pass input data to subsequent components without temporary storage. Also, input data received at second input lines 504 may also be of different bit widths. Input data such as kernel coefficients are transmitted to one or more registers 516 through multiple lines, each of which may transmit bits of the input data. Registers 516 may be used to duplicate bits that are used in combined computation circuit 510.

Output lines 506 may serve as the output of combined computation circuit 510. In one embodiment, output lines 506 may also be the output of the entire multiply circuit 500, but, in another embodiment, the multiply circuit 500 may include additional circuit components downstream of output lines 506 that are not shown in FIG. 5A. Output lines 506 are coupled to combined computation circuit 510. Similar to the input lines, output lines 506 may or may not contain any buffer components and may serve as wires to pass through the output data to subsequent components without temporary storage. Output lines 506 may include a first set of output lines 520 and a second set of output lines 522. The shaded areas in combined computation circuit 510 represent areas that may contain tab-out for connections with output lines 506. Example structure of the middle shaded area of combined computation circuit 510 will be discussed in further detail below with reference to FIG. 5D.

Combined computation circuit 510 is a circuit that may include a plurality of multipliers, adders, and demultiplexers. The combined computation circuit 510 is used to perform multiplications of two sets of input data respectively received from first input lines 502 and second input lines 504. The multiplications may be floating point multiplications or integer multiplications. Combined computation circuit 510 may first perform bit-wise multiplications, as conceptually represented by the multiplication symbols 524, for different combinations of bits. For a bit-wise multiplication, an AND gate may serve as a multiplier. Registers 512 and 516 may serve as buffers to duplicate bits of the two sets of input data. The bit values in registers 512 and 516 are shown as examples for the purpose of illustration and ease of reference. In the particular example shown in FIG. 5A, the multiplication is an 8-bit-time-8-bit multiplication. To perform the multiplication, each bit value in register 516 is duplicated for multiple columns. The eight-bit values in register 512 are also duplicated for different rows, but the bits are shifted one position to the left for each subsequent row. Combined computation circuit 510 may perform bit-wise multiplications on the bit values. For example, combined computation circuit 510 calculates the value at location 526 as "0" because it is a multiplication between the 4th bit (0) from register 516 and the 3rd bit (1) from register 512 (from LSB to MSB). Likewise, combined computation circuit 510 calculates the values at location 528 as "1"

because it is a multiplication between the 5th bit (1) from register 516 and the 3rd bit (1) from register 512.

The bit-wise multiplication results are added by a plurality of adders in combined computation circuit 510, which are conceptually represented by adder symbols 530. The precise arrangements of the adders may vary in various embodiments. The adders used in combined computation circuit 510 may be full adders or half adders. The adders combined may be implemented as any suitable adder structure such as ripple-carry adders, carry-lookahead adders, etc. to implement combined computation circuit 510. The final result of the multiplication of the input data stored in registers 512 and 516 can be double the bit width of the respective input data and may be outputted through output lines 520 and 522 as part of output lines 506. For the example shown in FIG. 5A, output lines 520 are not used because of reasons that will be explained in further detail below with reference to FIG. 5C.

In one embodiment, multiply circuit 500 can operate in different modes and be referred to a multi-mode multiply circuit. The different modes of multiply circuit 500 may be used to perform computations at variable bit widths. For example, in a first mode, multiply circuit 500 operates combined computation circuit 510 to generate outputs of a first bit width and, in a second mode, multiply circuit 500 operates combined computation circuit 510 to generate outputs of a second bit width. Using different bit widths, combined computation circuit 510 performs computations related to machine learning operations at different bit precision. At a first bit width, data values used in the multiply circuit may be represented by a certain number of bits (e.g., 4 bits). At a second bit width, data values used in the multiply circuit may be represented by another number of bits (e.g., 8 bits). In combined computation circuit 510 shown in FIGS. 5A and 5B, combined computation circuit 510 can operate as at least a single 8-bit multiplication block or a plurality of 4-bit multiplication blocks.

Figure 5B:
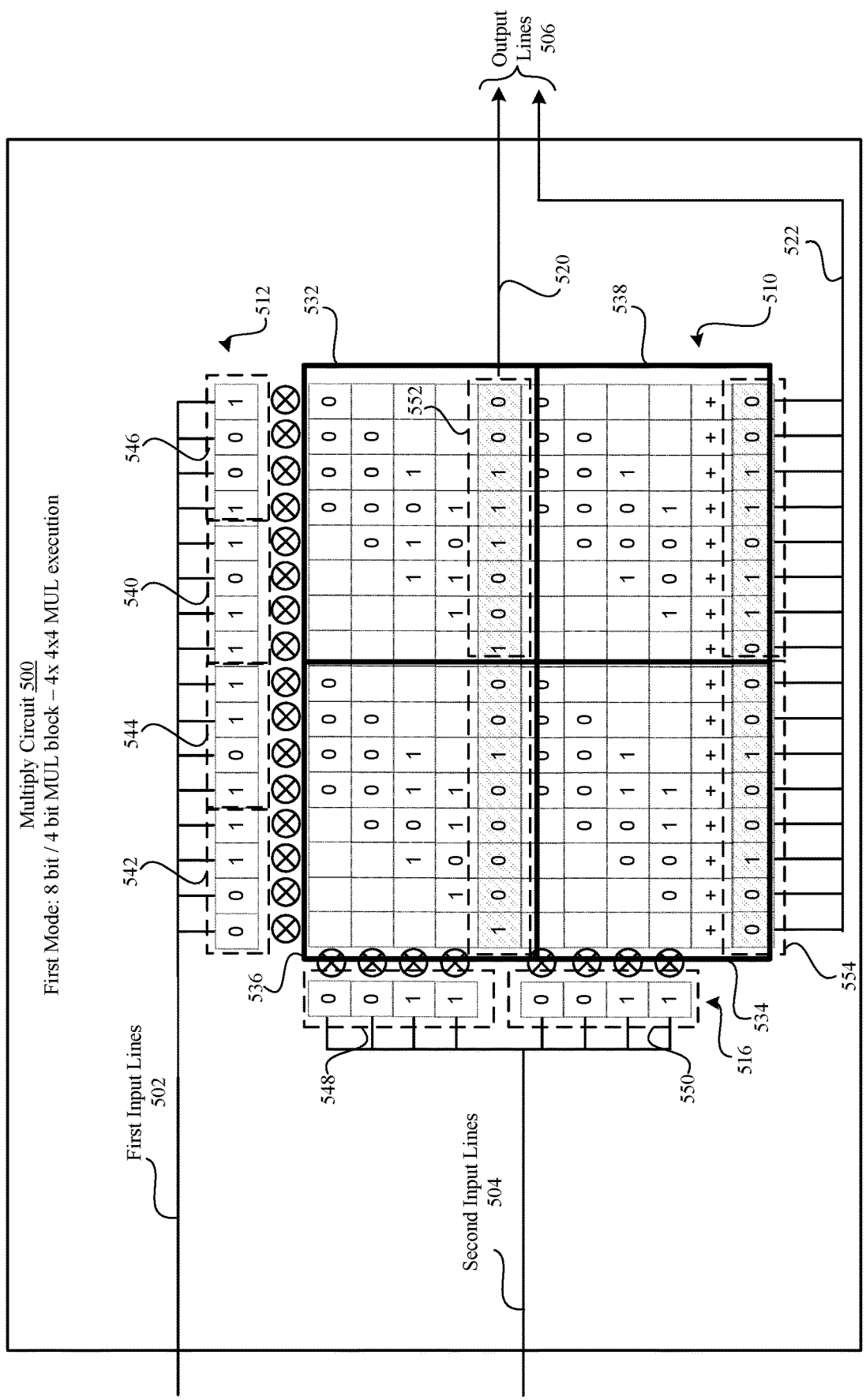
FIG. 5B is a conceptual diagram illustrating a first mode of operation of the neural engine circuit, according to one embodiment.

Referring to FIG. 5B, a first mode of operation of multiply circuit 500 is illustrated. In this mode, combined computation circuit 510 operates at a first bit width of 4 bit (which generates an output data of 8 bit) and operates as a plurality of multiplication blocks (e.g., 4 multiplication blocks in this example) in parallel. The input values that are stored in registers 512 and 516 are in 4 bits in this first mode. Since 4-bit width is smaller than the 8-bit width, a smaller number of multipliers and adders are used for performing the computation. As such, combined computation circuit 510 may be divided into multiple circuits for performing multiplication operations independently and in parallel. Combined computation circuit 510 may include at least a first multiply circuit 532 and a second multiply circuit 534. Depending on embodiments, combined computation circuit 510 may include additional circuits. For example, combined computation circuit 510 shown here also includes a third multiply circuit 536 and a fourth multiply circuit 538. The four multiply circuits are represented by bold-lined rectangles in FIG. 5B.

The multiplication in the first mode of a neural engine circuit 314 may generate output data by multiplying input data sent over first input lines 502 to kernel coefficients sent over second input lines 504 using multiple sub-parts of the combined computation circuit 510. In the particular example shown in FIG. 5B, register 512 stores four 4-bit input data 540, 542, 544, and 546 which respectively has the value 1101, 0011, 1011, and 1001. Register 516 stores first and second 4-bit kernel coefficients 548 and 550. In one embodiment, for each cycle of computation, multiply circuit 500 applies the same kernel coefficient to each of the input data 540, 542, 544, and 546. In other embodiments, kernel coefficient 548 and 550 may be different.

In performing the multiplication operations in the first mode, first multiply circuit 532 generates first output data 552 by multiplying first input data 540 with first kernel coefficient 548. The multiplication operation may be performed by a bit-wise multiplication followed with addition as discussed above with reference to FIG. 5A. First output data 552 may be an 8-bit value that may be output through output lines 520 in the shaded area of combined computation circuit 510. Similarly, in the first mode, second multiply circuit 534 generates second output data 554 of the first bit by multiplying second input data 542 with second kernel coefficient 550. Second output data 554 may be an 8-bit value that may be output through output lines 522 of combined computation circuit 510. Third multiply circuit 536 and fourth multiply circuit 538 may likewise perform multiplication operations to generate additional output data. First, second, third, and fourth multiply circuits 532, 534, 536, and 538 may generate the output data in parallel, such as in an operating cycle of neural engine circuit 314.

Figure 5C:
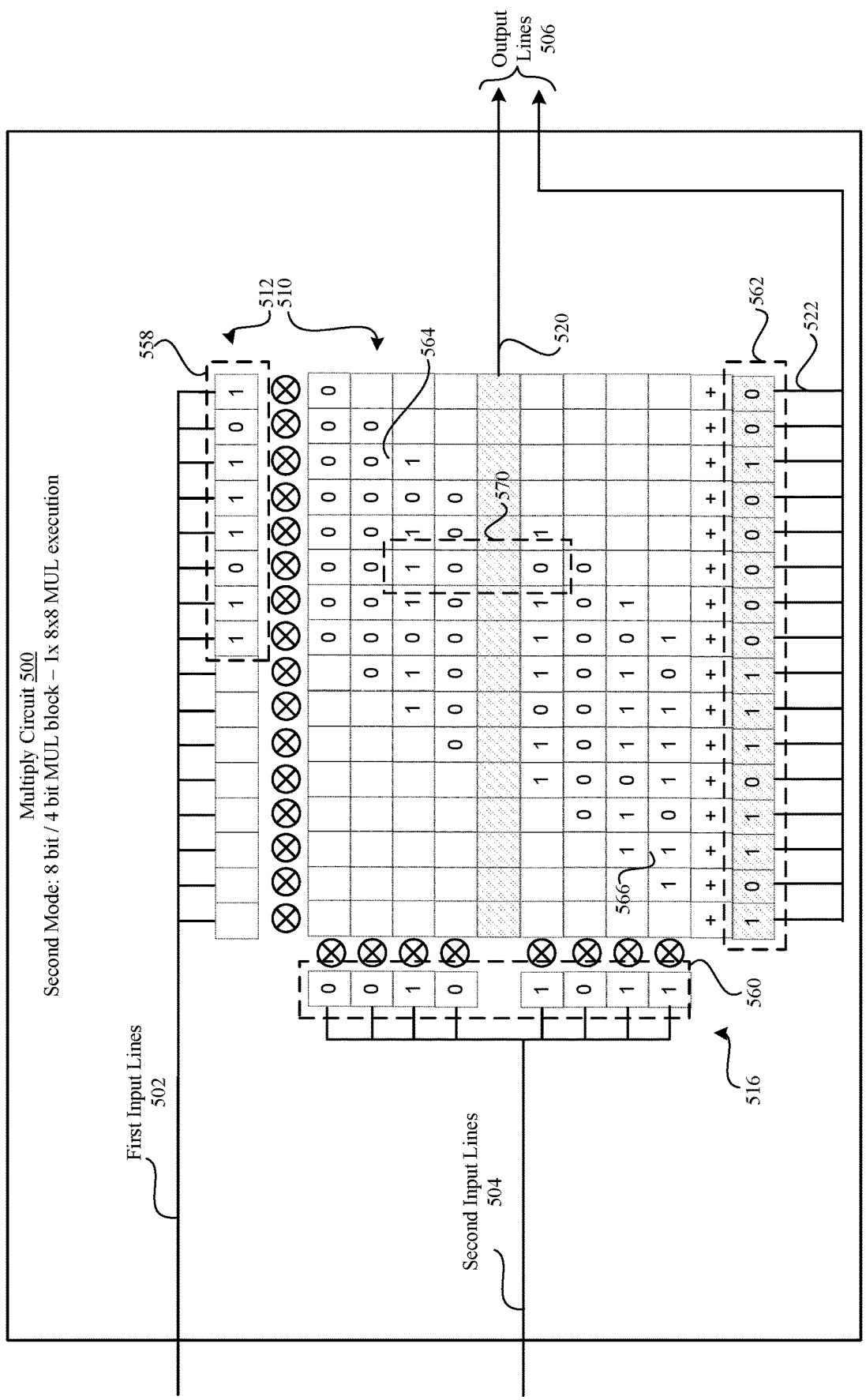
FIG. 5C is a conceptual diagram illustrating a second mode of operation of the neural engine circuit, according to one embodiment.

Referring to FIG. 5C, multiply circuit 500 operating in a second mode, which performs computation at 8-bit depth to generate a 16-bit output data, is shown. Register 512 stores third input data 558 that has an 8-bit value 11011101. Register 516 stores a third kernel coefficient 560 that has an 8-bit value 00101011. In the second mode, first multiply circuit 532 operates with at least second multiply circuit 534 as a part of combined computation circuit 510 to generate third output data 562 by multiplying third input data 558 with third kernel coefficient 560. The multiplication operation may be performed by a bit-wise multiplication followed by additions as discussed above with reference to FIG. 5A. The combined computation circuit 510 may include other circuit components in addition to first multiply circuit 532 and second multiply circuit 534 in performing the multiplication at a second bit width. Additional circuit components may be third multiply circuit 536, fourth multiply circuit 538, and other circuit components that are not used in the first mode of operation.

While two modes are shown in FIGS. 5B and 5C, multiply circuit 500 may include additional modes. For example, in one embodiment, multiply circuit 500 can also operate at a third bit width in a third mode. Each additional mode may be at a bit width that is a multiple of the smallest bit width. For example, a first mode may operate using input data at 2 bit, a second mode may operate at 4 bit, a third mode may operate at 8 bit, a fourth mode may operate at 16 bit, etc.

The multi-mode design of multiply circuit 500 allows the circuit to perform computations at different bit widths using the same hardware footprint. The adders and multipliers in first multiply circuit 532 and second multiply circuit 534 in the first mode may be reused in the second mode for computation of greater bit width. For example, first multiply circuit 532 may include a first adder at location 564 that is used to compute first output data 552 in the first mode. Second multiply circuit 534 may include a second adder at location 566 that is used to computer second output data 554 in the first mode. In the second mode, the first adder in first multiply circuit 532 is used to compute one of the least significant bits (LSBs) of third output data 562 and the second adder in second first multiply circuit 534 is used to compute one of the most significant bits (MSBs) of third output data 562, as shown in FIG. 5C.

The input lines and output lines of multiply circuit 500 may also be reused for different modes. For example, first input lines 502 includes a first set of input lines that are coupled to first multiply circuit 532 and a second set of input lines that are coupled to second multiply circuit 534. In the first mode, the first set of input lines receives first input data 540 and second set of input lines receives second input data 542. In the second mode, the first set of input lines receives LSBs of third input data 558 and the second set of input lines receives MSBs of third input data 558.

Since additional output data are generated for operation modes that are at a smaller bit width (e.g., the first mode), multiply circuit 500 may include additional output lines for routing output data in the first mode. For example, multiply circuit 500 may include output lines 520 and 522. In a greater-bit-width mode (e.g., the second mode), fewer output data are generated. For example, in the particular arrangement shown in FIG. 5C, only a single output data 562 is generated in the second mode. As such, output lines 520 are bypassed. The shaded area at output lines 520 may include one or more tab-out circuit components to route data based on modes of operations. A possible arrangement of the tab-out circuit components in, for example, area 570 according to an embodiment is shown in FIG. 5D.

Figure 5D:
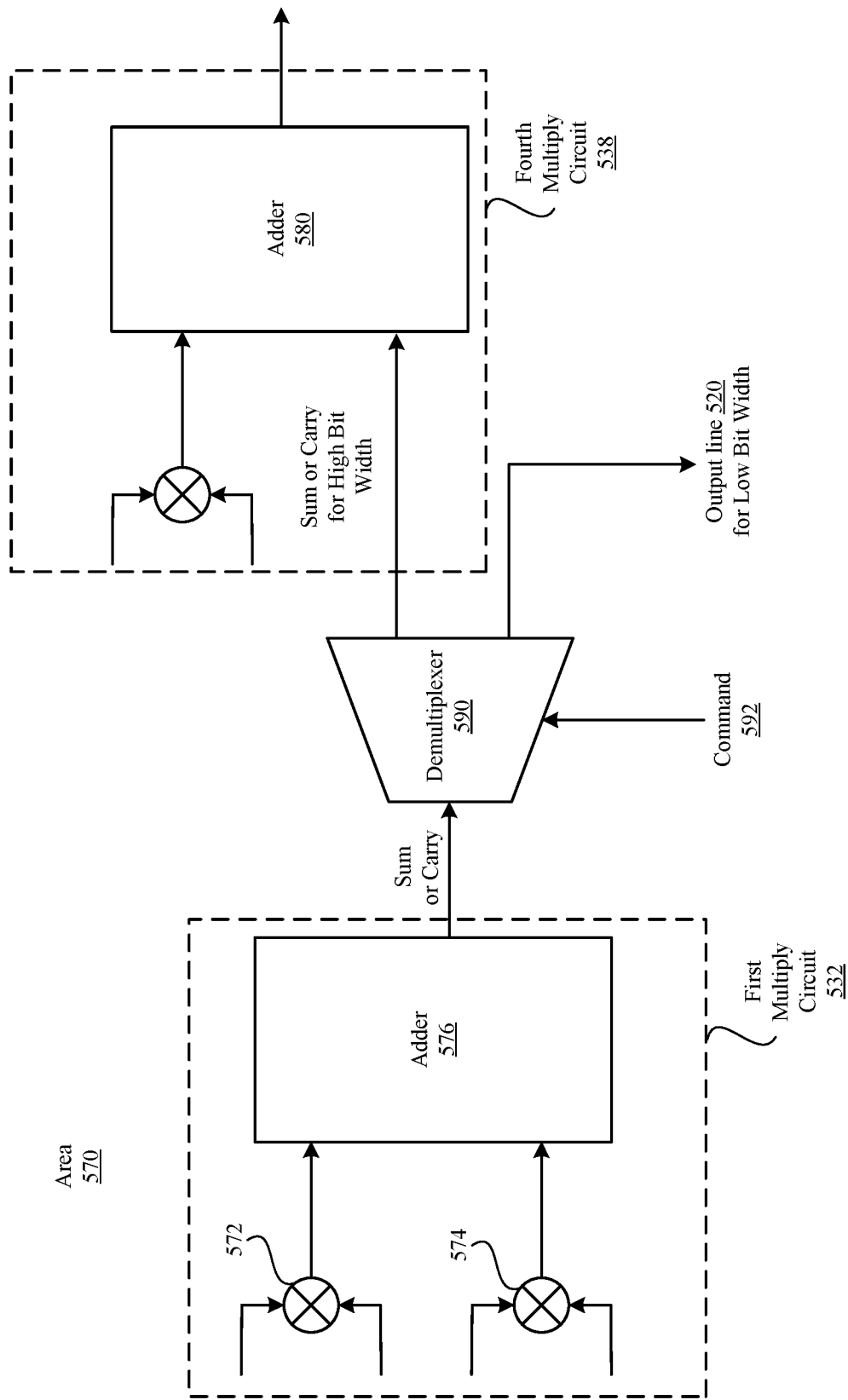
FIG. 5D is a block diagram illustrating example components that control the mode switching of the multi-mode neural engine, according to one embodiment.

Referring to FIG. 5D, a circuit diagram of an example tab-out circuit arrangement in area 570 according to an embodiment is shown. Multiply circuit 500 may include a plurality of adders, multipliers, and demultiplexers to perform the tab-out operations for a certain operation mode. Referring both to FIGS. 5C and 5D, FIG. 5D shows a part of first multiply circuit 532 and part of multiply circuit 538. For the part of the first multiply circuit 532 shown, multiply circuit 500 includes a first multiplier 572 and a second multiplier 574. Multipliers 572 and 574 may take the form of AND gates and may perform bit-wise multiplication of upstream data such as data from registers 512 and 516. Adder 576 may be a half adder or a full adder. Adder 576 performs an addition of the results of the bit-wise multiplications from multipliers 572 and 574. For simplicity, adder 576 is shown as having a single output value but in the case of a full adder, adder 576 includes both a sum and a carry as two outputs and the arrangement shown in FIG. 5D may include additional demultiplexers.

Depending on the operation mode, the output of adder 576 may be one of the final output bits of first multiply circuit 532 or an intermediate bit value that is used in another downstream computation for combined computation circuit 510. For example, in the first mode where first multiply circuit 532 and fourth multiply circuit 538 operate independently at first bit width (e.g., 4 bit), the output of adder 576 is one of the output bits of first multiply circuit 532. In the second mode where first multiply circuit 532 operates with fourth multiply circuit 538 as part of combined computation circuit 510, the output of adder 576 is only an intermediate bit, which may be a sum or a carry that is used for a downstream adder 580 of fourth multiply circuit 538.

Multiply circuit 500 includes a demultiplexer 590 that controls the switching of the output of adder 576 based on a command 592. In the first mode, the demultiplexer 590 switches the output to a first output line, which may be part of output lines 520. In the second mode, the demultiplexer 590 switches the output to a second output line, which may represent a sum or a carry of adder 576. The second output line of demultiplexer 590 is coupled to a downstream adder 580 that may be belong to another multiply circuit, which is shown as fourth multiply circuit 538 in the particular example shown in FIG. 5D, but may also be another multiply circuit such as second multiply circuit 534. Command 592 may be initiated by NE control 418 shown in FIG. 4, which may determine the command or receive the command from another source such as the source code of a machine learning model. Generating a command will be discussed in further detail with reference to FIG. 8.

Figure 6:
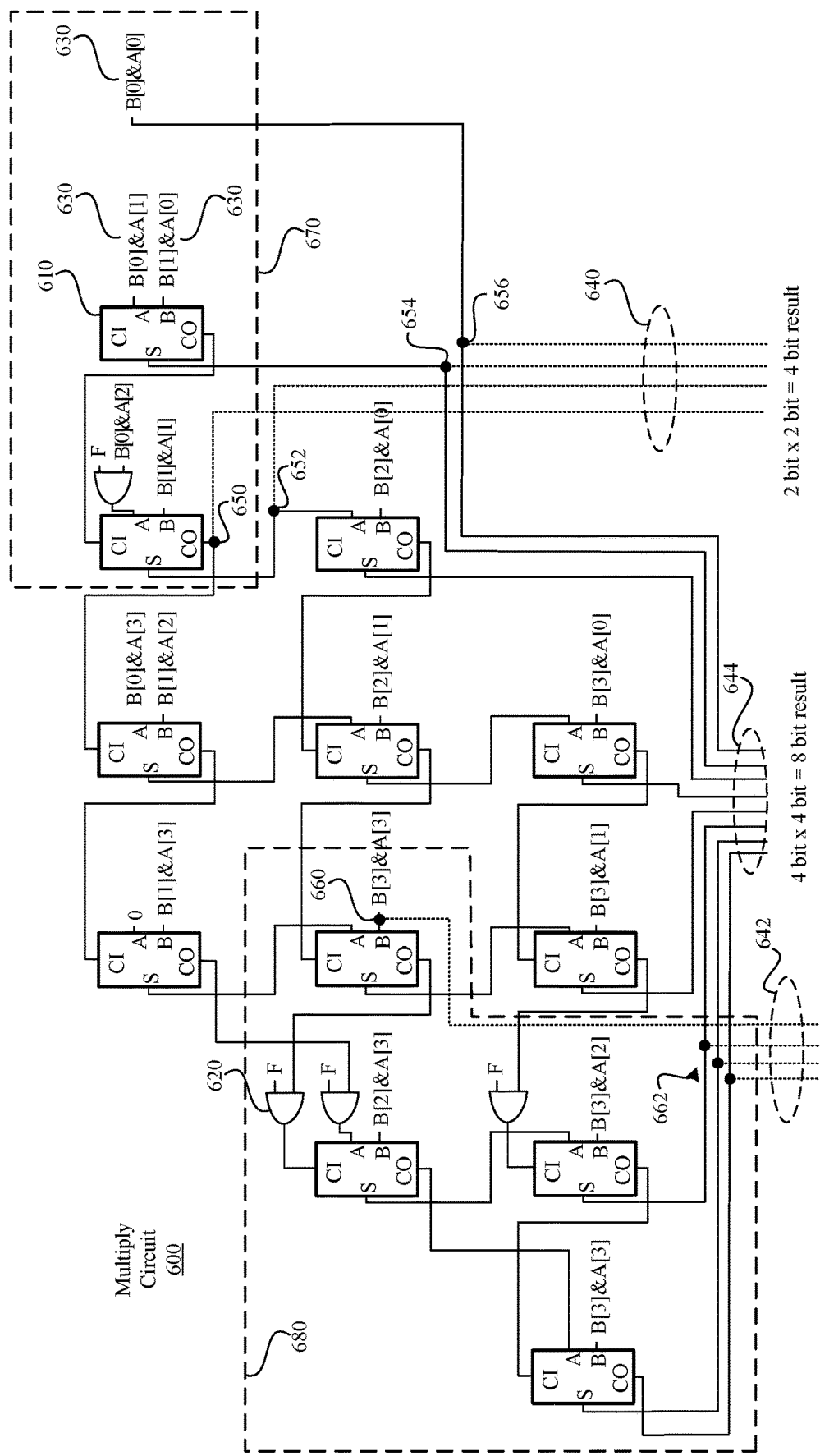
FIG. 6 is a circuit diagram illustrating an example multiply circuit, according to one embodiment.

FIG. 6 is a circuit diagram of a multiply circuit 600 illustrating an example implementation of combined computation circuit 510, in accordance with an embodiment. Multiply circuit 600 is a multi-mode circuit that can perform, in a first mode, two multiplication operations of 2 bits times 2 bits to generate two 4-bit value outputs. In a second mode, multiply circuit 600 can perform a single multiplication operation of 4 bits times 4 bits to generate an 8-bit value as output. While this arrangement of circuit components is shown in FIG. 6 as an example of combined computation circuit 510, combined computation circuit 510 may be in any other suitable arrangements for performing various multiplication operations. Also, a similar circuit that follows the logic of multiply circuit 600 may be constructed to operate at large bit widths, such as a circuit that can perform both 4 bits times 4 bits and 8 bits times 8 bits. Other bit depths are also possible.

Multiply circuit 600 may include a plurality of full adders 610, which can receive three inputs and two outputs. The three inputs are input value A, input value B, and carry in CI. The two outputs are sum S and carry out CO. Multiply circuit 600 may also include a plurality of multipliers that are represented as AND gates 620 or simply the "&" symbols in FIG. 6. Multiply circuit 600 may include a plurality of input terminals 630 that receive data value from input lines. The data value for each input terminal 630 is shown in FIG. 6. For example, FIG. 6 illustrates a multiplication of two 4-bit input data A and B. In the large bit depth mode (e.g., the second mode), the multiplication is performed between the bits A[3]A[2]A[1]A[0] and bits B[3]B[2]B[1]B[0]. In the small bit depth mode (e.g., the first mode), a first set of two 2-bit input data are saved in a first register (not shown in FIG. 6) and another set of two 2-bit input data is saved in another register. The multiplications are performed between the bits A[1]A[0] and bits B[1]B[0] and between the bits A[3]A[2] and bits B[3]B[2].

Multiply circuit 600 may further include a first set of output lines 640, a second set of output lines 642, which may correspond to output lines 520 in FIG. 5A, and a third set of output lines 644, which may correspond to output lines 522. The output lines include output terminals that may be connected to another downstream circuit component. At each of the nodes 650, 652, 654, and 656, multiply circuit 600 may include a demultiplexer that switches data between one of the first set of output lines and a downstream adder. Likewise, multiply circuit 600 may include demultiplexers at nodes 660 and 662.

Multiply circuit 600 is an example of a combined computation circuit 510 that can be operated in two or more modes. Like the combined computation circuit 510 in FIG. 5, multiply circuit 600 includes a first multiply circuit 670 and a second multiply circuit 680, as shown by the dash-lined boxes. In the first mode, the first multiply circuit 670 generates first output data of a first bit width (e.g., 4 bit) at output lines 640 by multiplying first input data (e.g., A[1] A[0]) with another input data (e.g., B[1]B[0]). The input data B may be a kernel coefficient or another suitable input. Likewise, in the first mode, the second multiply circuit 680 generates second output data of the first bit width (e.g., 4 bit) at output lines 642 by multiplying second input data (e.g., A[3]A[2]) with another input data (e.g., B[3]B[2]). The input data B[3]B[2] may be a kernel coefficient or another suitable input and may be the same or different from B[1]B[0]. In the second mode, first multiply circuit 670 operate with second multiply circuit 680 as part of a combined circuit of multiply circuit 600 to generate third output data of a second bit width (e.g., 8 bit) at output lines 644 by multiplying third input data that is 4 bit (e.g., A[3]A[2]A[1]A[0]) with another input data (e.g., B[3]B[2]B[1]B[0]). The input data B may also be a kernel coefficient. Multiply circuit 600 may include additional adders, multipliers, and other circuit components that are not used in the first mode.

Example Processes in Operating Neural Processors

Figure 7:
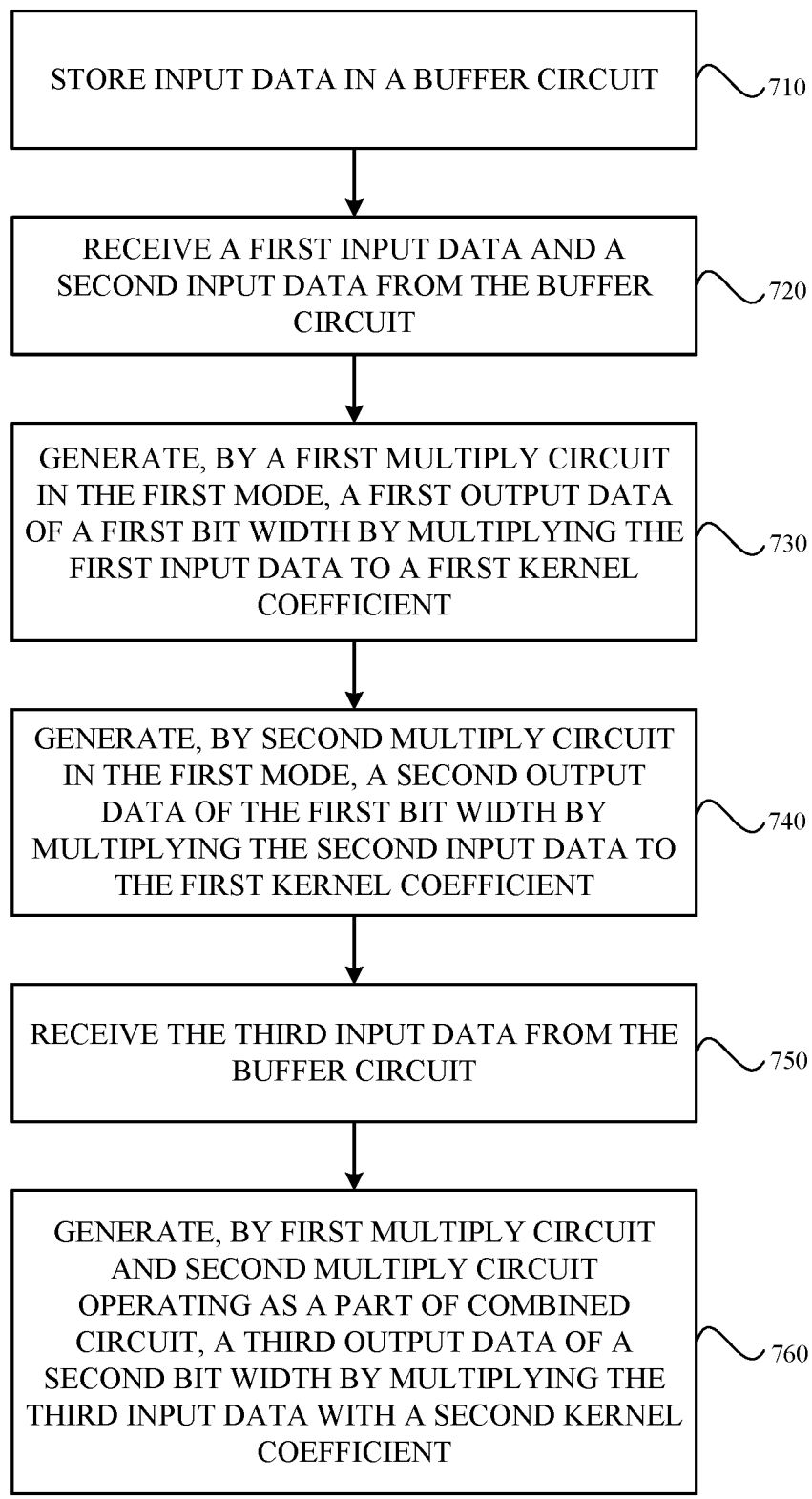
FIG. 7 is a flowchart illustrating a method of operating a neural processor, according to one embodiment.

FIG. 7 is a flowchart depicting an example process for operating a neural processor circuit 218, according to an embodiment. Neural processor circuit 218 may be used to perform computation related to machine learning models that are executed by electronic device 100. The performance of electronic device 100 may be affected by the speed of executing the machine learning models and the power consumption in executing those models. In some cases, based on instructions set forth by the code in the machine learning models or by dynamic detection of the conditions of the electronic device 100 or of the machine learning models being executed, neural processor circuit 218 may choose to select a higher quantization regime (e.g., a lower bit depth) to simplify certain calculation or a lower quantization regime.

This choice of quantization regimes provides a tradeoff between the performance of the machine learning model (e.g., the accuracy of the inference) and power consumption as well as the speed of executing the model. In some cases, data from various layers of a neural network may be calculated used different bit precisions. Using a CNN that includes multiple layers as an example, data from a first layer of the CNN and data from a second layer of the CNN may be computed using different bit precisions. For example, a typical CNN may have earlier layers (e.g., convolution layers) that are responsible for detecting edges and shapes and later layers (e.g., fully connected layers) that are responsible for identifying more abstract representation of high level features in an image. Early layers with higher bit precisions are often more beneficial because the layers can have a better dynamic range Neural processor circuit 218 may use a greater-bit-width operation mode to perform calculations for data in the earlier layers and a smaller-bit-width operation mode to perform calculations for data in the later layers. Since a multi-mode multiply circuits 500 may generate several outputs in parallel in a smaller-bit-width operation mode, the use of the mode not only improves power consumption but also speeds up the machine learning model.

In another example, electronic device 100 may use a series of machine learning models to perform more complex inferences. Earlies machine learning models in the series may perform coarse detections such as rough classifications of types of objects while later machine learning models in the series may perform more refined detections such as reach a conclusion to a precise concept, a word in machine translation, an object in an image, etc. Neural processor circuit 218 may use a smaller-bit-width operation mode to perform calculations for data related to coarse detections and a greater-bit-width operation mode to perform calculations for data related to refined detections.

Alternatively, or additionally, in some embodiments, neural processor circuit 218 may select dynamically switch bit width of computation by automatically detect certain conditions of electronic device 100 or by receiving instructions from a CPU that detects certain conditions of electronic device 100. For example, neural processor circuit 218 may switch to a high-bit-width operation mode for most or all calculations when electronic device 100 is plugged in or being charged by a power source. In contrast, neural processor circuit 218 may switch to a low-bit-width operation mode for most or all calculations when the battery level of electronic device 100 is low. The low-bit-width operation mode may also be used as a way to throttle neural processor circuit 218. Neural processor circuit 218 may also detect conditions of the machine learning models to dynamically determine the bit precision to use in performing calculating. For example, neural processor circuit 218 may monitor the value of a loss function in training a machine learning model. When the loss function value is approaching a convergence, neural processor circuit 218 may switch to a greater bit width for a more precise calculation. Likewise, neural processor circuit 218 may detect that a prediction is near a boundary of two classifications. In response, neural processor circuit 218 may switch to a greater bit width for a more precise calculation.

Referring to FIG. 7, neural processor circuit 218 may store 710 input data in a buffer circuit, such as buffer 334. The input data may be associated with different layers of a machine learning model. The input data may be transmitted to one of neural engines 314 for computation. At neural engine circuit 314, neural processor circuit 218 may receive 720 first input data and second input data. Both first and second input data may be data that are associated with one of the layers of a machine learning model. For example, the data may be intermediate values of the machine learning model that need to be determined for a particular layer. The data may be the weights of nodes in the layers, coefficients in the activation functions of the layers, image pixel values when the images reach the layer, or any suitable data that may be used in forward propagation or backpropagation of the layer.

Neural processor circuit 218 may use a multiply circuit 500 in a neural engine 314 to perform calculations of input data. Multiply circuit 500 may include a combined computation circuit 510 that includes at least a first multiply circuit 532 and a second multiply circuit 534. Using multiply circuit 500, neural processor circuit 218 may generate 730, by first multiply circuit 532 in the first mode, first output data of a first bit width by, for example, multiplying the first input data to a first kernel coefficient. In operating the first mode, neural processor circuit 218 may control the demultiplexers in multiply circuit 500 to output lines for outputs of the first bit width.

Neural processor circuit 218 may also generate 740, by second multiply circuit 534 in the first mode, second output data of the first bit width by, for example, multiplying the second input data to a second kernel coefficient. The multiplications in first multiply circuit 532 and second multiply circuit 534 may be performed in parallel in a single operating cycle. For example, buffer 334 may transmit both the first and second input data to a neural engine 314 simultaneously and neural engine 314 may complete calculation of the first and second output data in the same cycle of operation and transmit the output data back to buffer 334 or to another circuit component.

In another operating cycle, neural engine 314 may operate in a second mode. Buffer 334 may transmit third input data to neural engine 314. The third input data may have a large bit width than the first and second input data. Neural processor circuit may receive 750, at neural engine 314, the third input data. Neural processor circuit may generate 760, by first multiply circuit 532 and second multiply circuit 534 operating as a part of combined circuit 510, third output data of a second bit width by multiplying the third input data with a third kernel coefficient. The second bit width may be greater than the first bit width. The first and second input data may correspond to data of a first layer of a machine learning model and the third input data may correspond to data of a second layer of the machine learning model that precedes the first layer.

Figure 8:
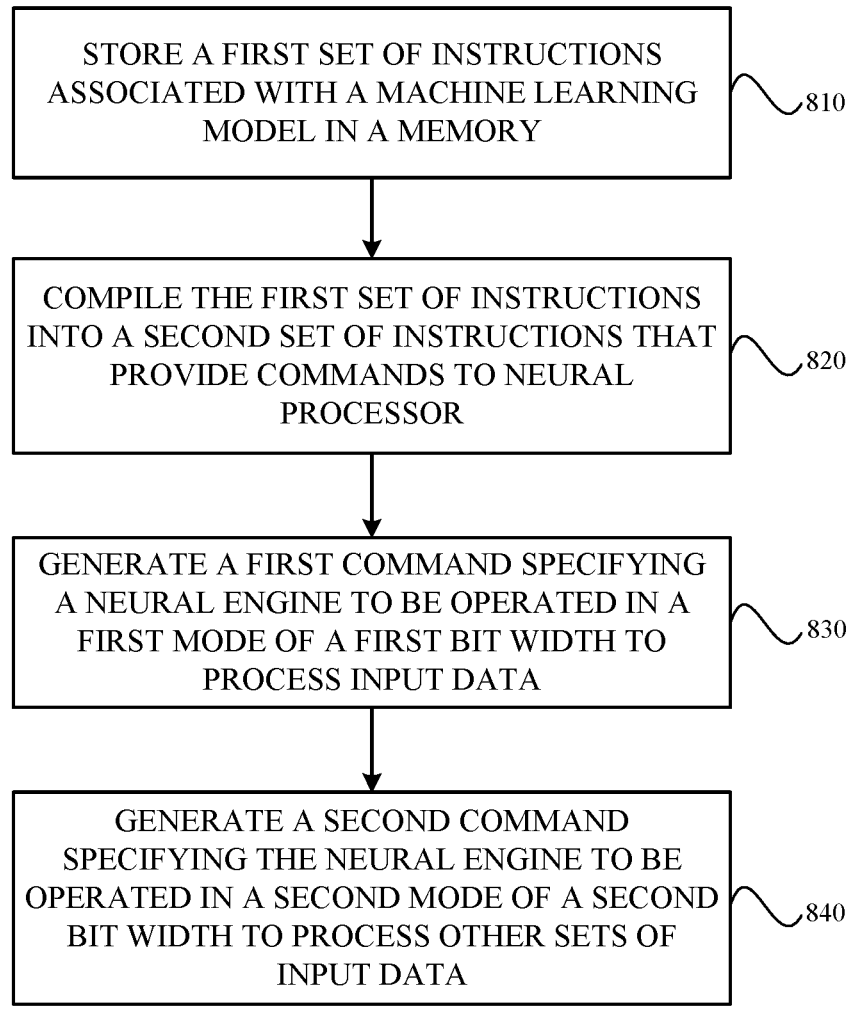
FIG. 8 is a flowchart illustrating a method of operating an electronic device, according to one embodiment.

FIG. 8 is a flowchart depicting an example process of operating an electronic device 100 with a neural processor 218, according to an embodiment. Electronic device 100 may store 810 a first set of instructions associated with a machine learning model in memory. For example, a data scientist or computer programmer may have designed and written the code for a machine learning model. The code may be saved in the hard drive or another suitable memory location of electronic device 100. The manufacturer of electronic device 100 or designer of the operating system of electronic device 100 may provide one or more libraries of code that allow a programmer to invoke neural processor 218 to execute the machine learning model. Likewise, manufacturers of neural processors 218 may also provide a driver that includes one or more libraries that can be integrated into certain programming languages for the programmer to invoke neural processor 218. Those libraries may include functions that allow a programmer to specify the bit width of a particular computation. In one case, the first set of instructions associated with a particular machine learning model may specify that data of a first layer in the machine learning model is to be computed at a first bit width and data of a second layer is to be computed at the second bit width.

In response to the machine learning model being executed, electronic device 100 may compile 820 the first set of instructions into a second set of instructions that provide commands to neural processor 218. The second set of instructions may be machine-readable code for the operation of neural processor 218. The compiling of the second set of instructions may be performed by a compiler that will be discussed in further detail below with reference to FIG. 9. The second set of instructions may specify the mode of operation for each operating cycle of a multi-mode neural engine 314 that can perform computations using different bit width.

In one embodiment, electronic device 100 may generate 830 a first command specifying neural engine 314 to be operated in a first mode of a first bit width to process input data. The first command may be generated as part of the second set of instructions in compiling the code of the machine learning model. The first bit width may be a small bit width so that neural engine 314 can separate combined computation circuit 510 into several multiply circuits for independent calculations. The input data may include first input data and second input data. The first command that is sent to neural engine 314 may cause NE control 418 to provide a command 592 that is sent to a demultiplexer to switch to first output lines based on the command.

Electronic device 100 may generate 840 a second command specifying a neural engine 314 to be operated in a second mode of a second bit width to process other sets of input data. The second command may be generated as part of the second set of instructions in compiling the code of the machine learning model. The second bit width may be a high bit width so that various multiply circuits may operate together as a combined computation circuit 510 to generate an output data. The input data may include third input data that may be multiplied with a kernel coefficient or another suitable data value of the same bit width as the third input data to generate the output data. The second command that is sent to neural engine 314 may cause NE control 418 to provide a command 592 that is sent to a demultiplexer to switch to second output lines based on the command.

Example Architecture of Compiler

Figure 9:
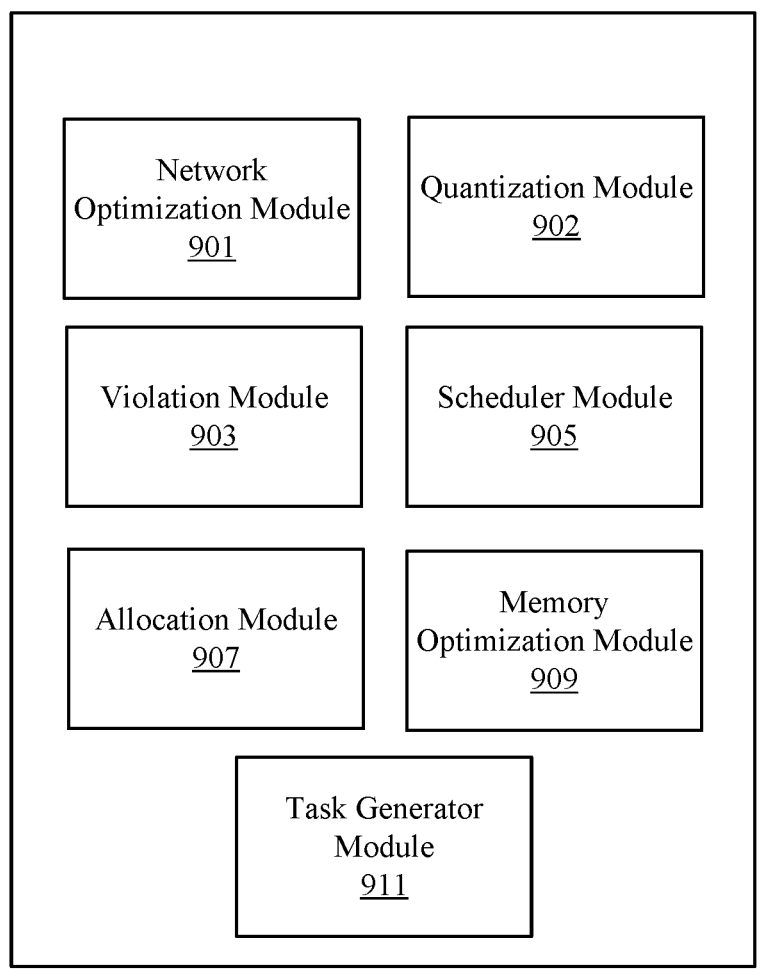
FIG. 9 is a block diagram of a compiler, according to one embodiment.

FIG. 9 is a block diagram illustrating a detailed view of the compiler 240, according to one embodiment. The compiler 240 may be a software module that receives information about a machine learning model such as a neural network and generates task descriptors corresponding to tasks that are executed by the neural processor circuit 218 to implement the neural network. To convert the neural network to one or more tasks executable on the neural processor circuit 218, the compiler 240 takes into account, among others, hardware restrictions and capabilities of components in the neural processor circuit 218 and one or more restrictions on tasks imposed by users. Although FIG. 2 illustrates the compiler 240 as being instantiated in system memory 230 of the electronic device 100, the compiler 240 may be instantiated on other memory components. Furthermore, the compiler 240 may be instantiated on and executed by a computing device distinct from the electronic device 100. In such a case, the task descriptors may be generated by the computing device and be sent to the electronic device 100 to embody the neural network.

The compiler 240 may include, among other software components, a network optimization module 901, a quantization module 902, a violation module 903, a scheduler module 905, an allocation module 907, a memory optimization module 909, and a task generator module 911. In other embodiments, the compiler 240 may include other modules in addition to those illustrated in FIG. 9. One or more components of the compiler may be embodied as a dedicated hardware circuit or a combination of dedicated hardware and software.

The network optimization module 901 is a software module or a hardware module that performs various optimizations on a neural network to be embodied by the neural processor circuit 218. After the neural network is loaded onto the compiler 240, the network optimization module 901 loads the neural network for implementing on the neural processor circuit 218. The neural network may be a deep neural network (DNN), ANN, CNN, RNN, or a DBN or any combination thereof, and may be represented in a directed acyclic graph (DAG). The network optimization module 901 may also receive information on a range of values in the input data, example input data and other information associated with kernel or input data of the neural network.

The network optimizations performed by the network optimization module 901 include, among others, converting a generic DAG corresponding to the neural network to a DAG of tasks specific to or configured for processing by the neural processor circuit 218. In doing so, the network optimization module 901 takes into account the hardware capabilities and restrictions of the neural processor circuit 218 and/or its components. The conversion of the DAG may include combining multiple layers of the generic DAG into a single task in the converted DAG, or splitting up a single layer in the generic DAG into multiple tasks in the converted DAG, depending on the nature of the tasks and capabilities of the neural processor circuit 218.

Figure 10:
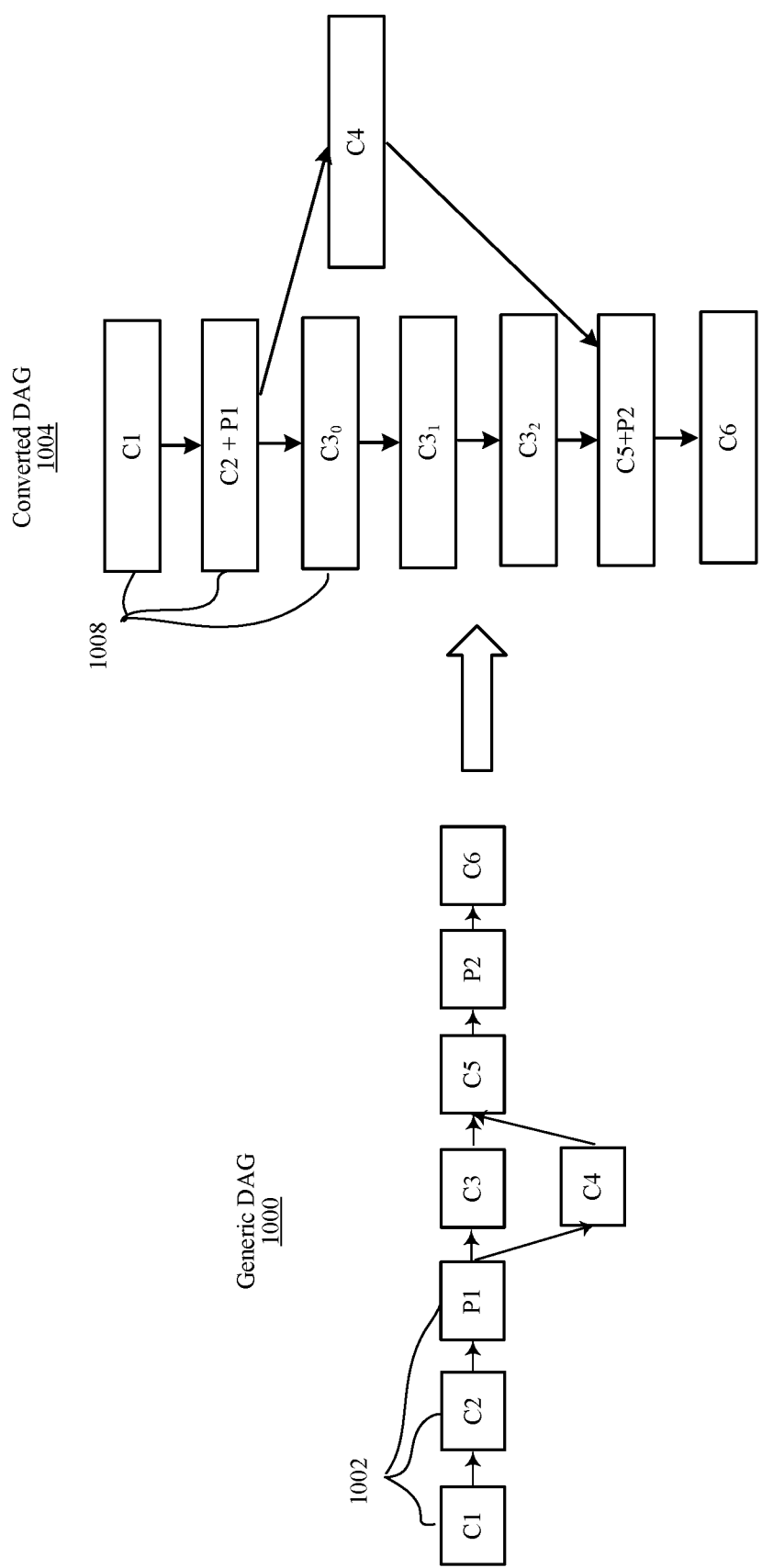
FIG. 10 is a block diagram illustrating a neural network represented by a list of tasks, according to one embodiment.

Referring to FIG. 10, a conceptual diagram of converting a generic DAG 1000 to a neural processor specific DAG 1004 is illustrated. Generic DAG 1000 includes 7 different layers 1002 of processing connected by arrows representing a flow of data. The generic DAG 1000 represents a neural network that is not specific to or confined to the neural processor circuit 218. In contrast, the converted DAG 1004 includes tasks 1008 that can be processed by the neural processor circuit 218. The layers 1002 and the tasks 1008 may have one-to-one correspondence, but not always so. As a result of the optimization process, the network optimization module 901 produces the converted DAG. In one embodiment, the optimization process also results in a network that is functionally equivalent to the original network. That is, the output of the converted DAG matches the output of the original network within the bounds of quantization errors.

For example, because a neural engine 314 of the neural processor circuit 218 has MAC 404 for performing convolution operations and a post-processor 428 for performing post-processing operations, the network optimization module 901 may collapse a C2 layer of the generic DAG 1000 and P1 post-processing layer (e.g., ReLU) into a single task (C2+P1) in the converted DAG 1004. Conversely, a C3 layer of the generic DAG 1000 may not be appropriate for a single task in the network processor circuit 218 due to reasons such as large kernel data size or large input data size. In such a case, the C3 layer of the generic DAG 1000 may be converted to three separate tasks $C3_0$, $C3_1$ and $C3_2$, as shown in FIG. 10. Also, the computation of each layer may be performed with different bit widths, as discussed above.

The network optimization module 901 may also combine a group of multiple convolution tasks that satisfy constraints into a single group-convolution task. Grouping multiple convolution tasks into a single group-convolution task allows for efficient processing of the convolutions tasks by the neural processor circuit 218.

The network optimization module 901 may also transform operations that are not directly supported by neural processor circuit 218 into mathematically equivalent operations that are supported by the neural processor circuit 218. For example, dilated convolutions are not directly supported by the neural processor circuit 218. However, the network optimization module 901 transforms dilated convolutions into a regular convolution with a sparse kernel (by inserting zeros between non-zero kernel values), which is supported relatively efficiently on neural processor circuit 218 where the neural processor circuit 218 ignores the majority of the inserted zeros. In one embodiment, the network optimization module 901 may perform operations to reduce overall latency, or latency of a specific branch of tasks, overall energy, or reduce peak power consumption.

Referring back to FIG. 9, the quantization module 902 produces the quantized versions of values or produces quantization parameters of other values for quantization during the runtime of the neural processor circuit 218. The quantization may be determined based on bit width selection for various data, as discussed above with reference to FIGS. 7 and 8. The values to be quantized by the quantization module 902 includes, among others, kernel coefficients (or palletized representative coefficients) and convolution bias. These values are known during the compilation before the runtime, and hence, quantized versions of these values can be produced by the quantization module 902 during the compilation process. Conversely, input data, intermediate data, and output data may not be known until the neural processor circuit 218 starts operation, and hence, the quantization module 902 produces quantization parameters for quantizing these values during runtime. The quantization parameters (e.g., scale and offset) are included as part of the task descriptor.

The violation module 903 is a software module or a hardware module that analyzes the results from the network optimization module 901 for any violations, and fixes them. The violations may relate to the hardware constraints for processing input data or kernels. For example, if the size of the input data or kernels associated with a task in the converted DAG is too large, the task may be split into sub-tasks, a kernel data that is larger than a threshold size may be split into smaller kernel data units. The violation module 903 may also detect violations related to a specific mode of the neural processor circuit 218 (e.g., splitting up a task for a batch mode in which different parts of the input data are processed by the same kernel data). If any corrections are made in the violation module 903, the corrected versions of the converted DAG, the quantization parameters and quantized kernel coefficients are produced by the violation module 903.

The scheduler module 905 is a software module or a hardware module that determines the schedule of tasks related to the converted DAG. Generally, a neural network may include network layers or sub-layers that are implemented as a series of tasks executed by the neural processor circuit 218. The scheduler module 905 determines the order of tasks as described in the converted DAG generated by the network optimization module 901. In order to determine the schedule, the scheduler module 905 may traverse certain paths of the converted DAG to determine the order of tasks. Referring back to FIG. 10, for example, the scheduler module 905 may decide to perform task C4 followed by tasks $C3_0$ through $C3_2$ or vice versa based on, for example, a bandwidth requirement of tasks in each branch. If shared input data is non-resident and will be stored in the data buffer 334 by a first branch, it is beneficial to schedule tasks that are compute bound rather than bandwidth bound. In one embodiment, the scheduler module 905 may delay the scheduling of tasks to reduce the peak short time power.

In one embodiment, the allocation module 907 is a software module or a hardware module that determines how the input data is to be segmented into slices, tiles and work units. That is, the allocation module 907 determines the shapes and dimensions of slices, tiles and work units to be segmented by rasterizers, such as rasterizer 430.

The allocation module 907 also determines how to allocate memory space of the data buffer 334 or the system memory 230 for performing the tasks. The allocation module 907 determines the memory space in the data buffer 334 for storing a tile of input data, intermediate data generated in a previous cycle of neural engines 314 for further processing in a subsequent cycle of neural engines, and slice of output data resulting from the processing at neural engines 314. In one embodiment, the allocation module 907 prioritizes storing data in and retrieving data from the data buffer 334 instead of system memory 230 to reduce the time, power, and data transfer bandwidth associated with providing the input data to the neural engines 314. By storing the input data in the data buffer 334, the input data is local to the neural engines 314 compared to if the input data were stored in the system memory 230 resulting in less power consumption and improved processing time of the input data.

Input data may be split into smaller pieces of data for parallel processing at multiple neural engines 314. The allocation module 907 analyzes the hierarchy and layers of the neural network and determines how the input data is to be segmented based on the hardware constraints of the neural processor circuit 218. One of the functions of the allocation module 907 is to determine how input data is to be split into slices and then split into tiles for storing in the data buffer 334 so that a segment of input data for processing can be retrieved by the neural engines 314.

Figure 11:
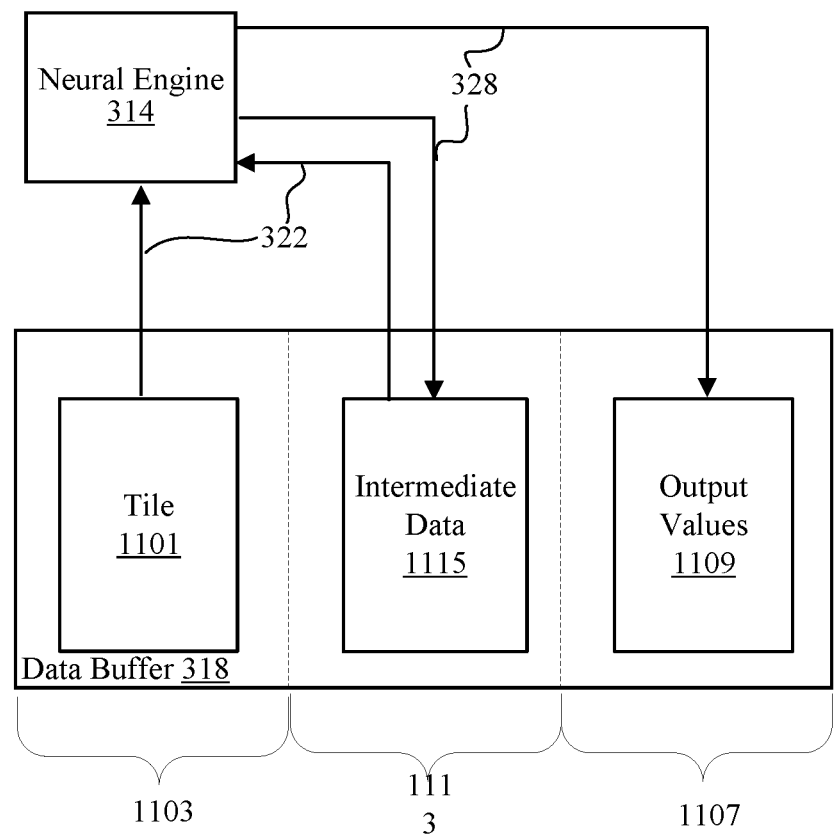
FIG. 11 is a diagram illustrating allocation of memory space of a data buffer in the neural processor circuit, according to one embodiment.

In one embodiment, the allocation module 907 allocates a portion of the data buffer 334 to store a tile of the input data. For example, FIG. 11 illustrates storing tile 1101 in first memory space 1103 of the data buffer 334. The tile 1101 is received, for example, from the system memory 230 via a DMA process and stored in the data buffer 334 until the processing of the tile 1101 is completed. A portion of the tile 1103 (e.g., a work unit) is transmitted to a neural engine 314 and processed by the neural engine 314 during a single cycle of the neural engine 314.

The allocation module 907 also allocates a portion of the data buffer 334 to store output values generated by a neural engine 314 in response to processing a work unit of the input data at the neural engine 314. The processing of the work unit may be performed in a single processing cycle or across multiple processing cycles. For example, FIG. 11 illustrates allocating memory space 1107 of the data buffer 334 to store output values 1109 generated by the neural engine 314. The output values stored in the data buffer 334 are then stored in system memory 230.

In one embodiment, the allocation module 901 also allocates a portion of the data buffer 334 to store intermediate data. In one embodiment, intermediate data is data generated at neural engine 314 during one processing cycle for processing by neural engine 314 in a subsequent processing cycle. For example, FIG. 11 illustrates allocating memory space 1113 of the data buffer 334 to store intermediate data 1115 output by neural engine 314 during a processing cycle. The intermediate data 1115 is transmitted back to neural engine 314 for further processing during a subsequent processing cycle.

The memory optimization module 909 is a software module or a hardware module that performs various memory related optimization operations associated with the neural processor circuit 218. As part of the memory optimization, memory manipulation operations (e.g., splitting and concatenation) may be collapsed into its surrounding operations (which themselves may be memory manipulation operations or computation operations). This is possible because the neural network processor circuit 218's DMA 320 is capable of accessing a slice of a tensor both when reading and writing to the data buffer 334.

In one embodiment, slicing describes accessing subranges of certain dimensions, possibly with strides. Slicing lacks any cost (e.g., is computationally free) when performed as part of a computation operation, whereas slicing would incur a large overhead if it is performed as a standalone memory manipulation operation. The memory optimization module 909 is able to eliminate most of the standalone memory manipulation operations in typical DNN DAGs.

In one embodiment, the memory optimization module 909 also provides information for performing efficient caching operation at a memory device (e.g., a cache device) between the system memory 230 and the neural network processor circuit 218. The memory optimization module 909 generates the cache information based on the characteristics of the input data such as the size and shape of the input data. The cache information is part of the task descriptors and is communicated to the DMA 320 by the neural task manager 310. Based on the cache information, the DMA 320 annotates each individual memory transaction request with a "cache hint" field. Upon receiving a memory request, the system cache, which is located between the neural processor circuit 218 and the system memory 230, will use a different caching policy based on the request's cache hint field. As a result, a determination can be made as to data that is allocated to the system cache and data that is not allocated to the system cache. Since the system cache is a limited system-wide resource, data that is to be allocated to system cache is prioritized. In one embodiment, cache hints are optimized to minimize power (prioritize data that is accessed frequently) or maximize performance (prioritize data that needs to be accessed quickly). Note that system cache has an order of magnitude higher bandwidth and order of magnitude lower power when compared to the system memory 230.

The task generator module 911 is a software module or a hardware module that assembles task descriptors corresponding to the tasks in the converted DAG. A task descriptor defines a configuration of components in the neural processor circuit 218 to execute the task associated with the task descriptor. Each task descriptor for a task comprises a task descriptor header and configuration registers. The task descriptor header comprises configurations related to the task manager's behavior for the task. In one embodiment, the task descriptor header comprises 28 or 32 Bytes and is written at the beginning of each task descriptor. The task descriptor header includes a plurality of fields. The fields include a task ID, a network ID, an estimated number of cycles required to execute the task to execute, and indications of the allocations memory of the data buffer 334, etc. The fields may also include task-switch enable (TSE), task-switch ready (TSR), destination pointer change (DPC), source pointer change (SPC), and source pointer last (SPL). The compiler 240 may specify task switch behavior based on the fields in the task descriptor header comprising TSE, TSR, DPC, SPC, and SPL.

In one embodiment, the task configuration registers indicate values to be set in registers of the components of the neural processor circuit 218 to perform the related task. The task configuration registers include a plurality of fields. The fields include a register address indicative of the address of the register to write, a field that describes the number of consecutive registers to be written using auto-increment of the address in the register address field, and register data describing the payload to write.

The task descriptors, after being assembled by the task generator module 911, are sent to the neural task manager 310 to set the operations of the neural task manager 310 and other components of the neural processor circuit 218.

The task generator module 911 may also compile kernel binary. The task generator module 911 prepares kernel coefficients in the order that the neural processor circuit 218 will consume the kernel coefficients and packs the kernel coefficients into a binary blob.

Example Process of the Compiler

Figure 12:
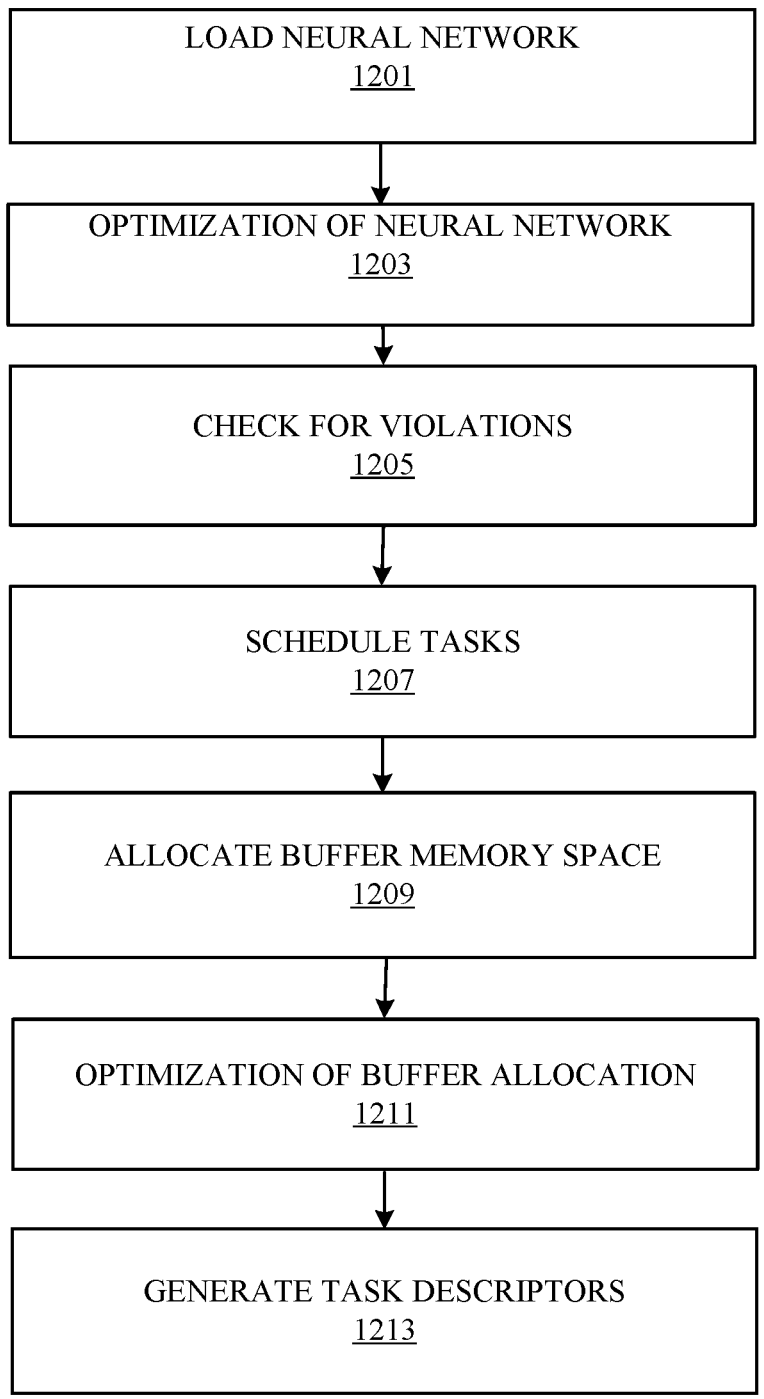
FIG. 12 is a flowchart illustrating a method of the compiler, according to one embodiment.

FIG. 12 is a flowchart illustrating a method of compiler 240, according to one embodiment. The compiler 240 loads 1201 the neural network. The neural network may be a DNN, ANN, CNN, RNN, DBN, or any combination thereof and may be represented by a DAG. The compiler 240 performs 1203 network related optimizations of the neural network. The network related optimizations include for example converting the generic DAG corresponding to the neural network to a DAG of tasks specific to or configured for processing by the neural processor circuit 218. The conversion of the DAG may include combining multiple layers of the generic DAG into a single task in the converted DAG, or splitting up a single layer in the generic DAG into multiple tasks in the converted DAG, depending on the nature of the tasks and capabilities of the neural processor circuit 218. Thus, the compiler 240 accounts for the hardware capabilities and restrictions of the neural processor circuit 218. The compiler 240 may also determine quantization parameters for values stored in the neural processor circuit 218.

The compiler 240 then checks 1205 the optimizations for any violations and fixes any identified violations. The violations may relate to the hardware constraints for processing input data or kernels. After violations have been corrected, the compiler schedules 1207 tasks to be performed by the neural processor circuit 218. The compiler 240 determines the order of tasks as described in the converted DAG by traversing certain paths of the converted DAG.

The compiler 240 allocates buffer memory spaces of the memory buffer within the neural processor circuit 218 to input data related to the tasks. Specifically, the compiler 240 determines the memory space in the data buffer 334 for storing a tile of input data, intermediate data generated in a previous cycle of neural engines 314 for further processing in a subsequent cycle of neural engines, and slice of output data resulting from the processing at neural engines 314. The buffer allocations may be optimized 1211 by the compiler 240. For example, the compiler 240 determines the shapes and dimensions of slices, tiles and work units to be segmented by rasterizers. The optimizations further include providing information for performing an efficient caching operation at a cache device between the system memory 230 and the neural network processor circuit 218. The compiler 240 next generates 1213 task descriptors corresponding to the tasks in the converted DAG. A task descriptor defines a configuration of components in the neural processor circuit 218 to execute the task associated with the task descriptor.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor, comprising:
    a buffer circuit configured to store input data; and
    a neural engine circuit coupled to the buffer circuit, the neural engine circuit comprising a first multiply circuit and a second multiply circuit, and the neural engine circuit configured to:
        receive, in a first mode, first input data and second input data from the buffer circuit,
        generate, in the first mode using the first multiply circuit, first output data of a first bit width by multiplying the first input data to a first kernel coefficient,
        generate, in the first mode using the second multiply circuit, second output data of the first bit width by multiplying the second input data to a second kernel coefficient,
        receive, in the second mode, third input data from the buffer circuit, and
        operate, in the second mode, the first multiply circuit with at least the second multiply circuit as a combined computation circuit to generate third output data of the second bit width by multiplying the third input data to a third kernel coefficient, wherein the combined computation circuit comprises a first set of input lines coupled to the first multiply circuit and a second set of input lines coupled to the second multiply circuit, wherein, in the first mode, the first set of input lines is configured to receive the first input data and the second set of input lines is configured to receive the second input data, and wherein, in the second mode, the first set of input lines is configured to receive least significant bits of the third input data and the second set of input lines is configured to receive most significant bits of the third input data.

2. The neural processor of claim 1, wherein the first and second input data correspond to data of a first layer of a convolutional neural network, and the third input data correspond to data of a second layer of the neural network different from the first layer.

3. The neural processor of claim 2, wherein the second layer precedes the first layer in the convolutional neural network.

4. The neural processor of claim 1, wherein the first multiply circuit and the second multiply circuit are configured to generate the first output and the second output in parallel.

5. The neural processor of claim 1, wherein the first multiply circuit comprises a plurality of adders and a plurality of demultiplexers, at least one of the demultiplexers configured to switch to a first output line in the first mode and switch to a second output line in the second mode.

6. The neural processor of claim 5, wherein the first output line is an output of the first multiply circuit and the second output line is connected to a downstream adder in the second multiply circuit.

7. The neural processor of claim 1, wherein the first multiply circuit comprises a first adder and the second multiply circuit comprises a second adder, wherein, in the second mode, the first adder is configured to compute one of least significant bits of the third output data and the second adder is configured to compute one of most significant bits of the third output data.

8. The neural processor of claim 1, wherein the neural engine circuit is further configured to operate at a third bit width in a third mode.

9. The neural processor of claim 1, wherein the first kernel coefficient and the second kernel coefficient have the same value.

10. The neural processor of claim 1, wherein the neural processor is configured to determine a mode of the neural engine circuit based on an instruction included in code associated with a convolutional neural network.

11. The neural processor of claim 1, wherein the neural processor is configured to automatically determine a selection of bit width.

12. A method for operating a neural processor, the method comprising:
    storing input data in a buffer circuit, the input data including a first input data, a second input data, and a third input data;
    generating, by a first multiply circuit of a neural engine circuit operating a first mode, first output data of a first bit width by multiplying the first input data to a first kernel coefficient;
    generating, by a second multiply circuit of the neural engine circuit operating in the first mode, second output data of the first bit width by multiplying the second input data to a second kernel coefficient; and
    by the first multiply circuit and the second multiply circuit operating as a part of a combined computation circuit, third output data of a second bit width by multiplying the third input data with a third kernel coefficient, wherein the combined computation circuit comprises a first set of input lines coupled to the first multiply circuit and a second set of input lines coupled to the second multiply circuit, wherein, in the first mode, the first set of input lines is configured to receive the first input data and the second set of input lines is configured to receive the second input data, and wherein, in the second mode, the first set of input lines is configured to receive least significant bits of the third input data and the second set of input lines is configured to receive most significant bits of the third input data.

13. The method of claim 12, wherein the first and second input data correspond to data of a first layer of a convolutional neural network, and the third input data correspond to data of a second layer of the neural network different from the first layer.

14. The method of claim 13, wherein the second layer precedes the first layer in the convolutional neural network.

15. The method of claim 13, further comprising:
receiving, from code associated with a convolutional neural network, a first instruction to perform calculation of the first layer in the convolutional neural network using the first bit width;
causing, based on the first instruction, the neural engine circuit in the first mode;
receiving, from the code associated with the convolutional neural network, a second instruction to perform calculation of the second layer in the convolutional neural network using the second bit width; and
causing, based on the second instruction, the neural engine circuit in the second mode.

16. An electronic device, comprising:
a memory storing a first set of instructions associated with a machine learning model;
a neural processor, comprising:
a buffer circuit configured to store input data associated with the machine learning model; and
a neural engine circuit coupled to the buffer circuit, the neural engine circuit comprising a first multiply circuit and a second multiply circuit, and the neural engine circuit configured to:
receive, in a first mode, first input data and second input data from the buffer circuit,
generate, in the first mode using the first multiply circuit, first output data of a first bit width by multiplying the first input data to a first kernel coefficient,
generate, in the first mode using the second multiply circuit, second output data of the first bit width by multiplying the second input data to a second kernel coefficient,
receive, in the second mode, third input data from the buffer circuit, and
operate, in the second mode, the first multiply circuit with at least the second multiply circuit as a combined computation circuit to generate third output data of the second bit width by multiplying the third input data to a third kernel coefficient, wherein the combined computation circuit comprises a first set of input lines coupled to the first multiply circuit and a second set of input lines coupled to the second multiply circuit, wherein, in the first mode, the first set of input lines is configured to receive the first input data and the second set of input lines is configured to receive the second input data, and wherein, in the second mode, the first set of input lines is configured to receive least significant bits of the third input data and the second set of input lines is configured to receive most significant bits of the third input data.

17. The electronic device of claim 16, wherein the first set of instructions specifies that data of a first layer in the machine learning model is to be computed at the first bit width and data of a second layer in the machine learning model is to be computed at the second bit width, and wherein the first and second input data correspond to the data of the first layer, and the third input data corresponds to the data of the second layer.

18. The electronic device of claim 16, further comprises a compiler processor, the compiler processor configured to:
compile the first set of instructions into a second set of instructions that provide commands to the neural processor, wherein the compiling comprises:
generating a first command specifying the neural engine circuit to be operated in the first mode to process the first and second input data, and
generating a second command specifying the neural engine circuit to be operated in the second mode to process the third input data.

19. The electronic device of claim 18, the neural engine circuit comprises a plurality of adders and a plurality of demultiplexers, at least one of the demultiplexers comprising a first output line and a second output line, the at least one of the demultiplexers configured to:
receive, in the first mode, the first command,
switch to the first output line based on the first command,
receive, in the second mode, the second command, and
switch to the second output line based on the second command.

20. A neural processor, comprising:
a buffer circuit configured to store input data; and
a neural engine circuit coupled to the buffer circuit, the neural engine circuit comprising a first multiply circuit and a second multiply circuit, and the neural engine circuit configured to:
receive, in a first mode, first input data and second input data from the buffer circuit,
generate, in the first mode using the first multiply circuit, first output data of a first bit width by multiplying the first input data to a first kernel coefficient,
generate, in the first mode using the second multiply circuit, second output data of the first bit width by multiplying the second input data to a second kernel coefficient,
receive, in the second mode, third input data from the buffer circuit, and
operate, in the second mode, the first multiply circuit with at least the second multiply circuit as a combined computation circuit to generate third output data of the second bit width by multiplying the third input data to a third kernel coefficient,
wherein the first multiply circuit comprises a plurality of adders and a plurality of demultiplexers, at least one of the demultiplexers configured to switch to a first output line in the first mode and switch to a second output line in the second mode; and
wherein the first output line is an output of the first multiply circuit and the second output line is connected to a downstream adder in the second multiply circuit.

21. The neural processor of claim 20, wherein the first and second input data correspond to data of a first layer of a convolutional neural network, and the third input data correspond to data of a second layer of the neural network different from the first layer.

22. The neural processor of claim 21, wherein the second layer precedes the first layer in the convolutional neural network.

23. The neural processor of claim 20, wherein the first multiply circuit and the second multiply circuit are configured to generate the first output and the second output in parallel.

24. The neural processor of claim 20, wherein the first multiply circuit comprises a first adder and the second multiply circuit comprises a second adder, wherein, in the second mode, the first adder is configured to compute one of least significant bits of the third output data and the second adder is configured to compute one of most significant bits of the third output data.

25. The neural processor of claim 20, wherein the neural engine circuit is further configured to operate at a third bit width in a third mode.

26. The neural processor of claim 20, wherein the first kernel coefficient and the second kernel coefficient have the same value.

27. The neural processor of claim 20, wherein the neural processor is configured to determine a mode of the neural engine circuit based on an instruction included in code associated with a convolutional neural network.

28. The neural processor of claim 20, wherein the neural processor is configured to automatically determine a selection of bit width.

29. A neural processor, comprising:
a buffer circuit configured to store input data; and
a neural engine circuit coupled to the buffer circuit, the neural engine circuit comprising a first multiply circuit and a second multiply circuit, and the neural engine circuit configured to:
  receive, in a first mode, first input data and second input data from the buffer circuit,
  generate, in the first mode using the first multiply circuit, first output data of a first bit width by multiplying the first input data to a first kernel coefficient,
  generate, in the first mode using the second multiply circuit, second output data of the first bit width by multiplying the second input data to a second kernel coefficient,
  receive, in the second mode, third input data from the buffer circuit, and
  operate, in the second mode, the first multiply circuit with at least the second multiply circuit as a combined computation circuit to generate third output data of the second bit width by multiplying the third input data to a third kernel coefficient,
  wherein the first multiply circuit comprises a first adder and the second multiply circuit comprises a second adder, wherein, in the second mode, the first adder is configured to compute one of least significant bits of the third output data and the second adder is configured to compute one of most significant bits of the third output data.

30. The neural processor of claim 29, wherein the first and second input data correspond to data of a first layer of a convolutional neural network, and the third input data correspond to data of a second layer of the neural network different from the first layer.

31. The neural processor of claim 30, wherein the second layer precedes the first layer in the convolutional neural network.

32. The neural processor of claim 29, wherein the first multiply circuit and the second multiply circuit are configured to generate the first output and the second output in parallel.

33. The neural processor of claim 29, wherein the neural engine circuit is further configured to operate at a third bit width in a third mode.

34. The neural processor of claim 29, wherein the first kernel coefficient and the second kernel coefficient have the same value.

35. The neural processor of claim 29, wherein the neural processor is configured to determine a mode of the neural engine circuit based on an instruction included in code associated with a convolutional neural network.

36. The neural processor of claim 29, wherein the neural processor is configured to automatically determine a selection of bit width.

* * * * *